United States Patent
Smeaton et al.

(10) Patent No.: US 10,443,642 B2
(45) Date of Patent: Oct. 15, 2019

(54) STAPLE

(71) Applicants: Quick Grip Staples (HK) Limited, Hong Kong (HK); Kevin Roy Smeaton, Balmoral (AU); Kevin Graham Doole, Alderley (AU)

(72) Inventors: Kevin Roy Smeaton, Balmoral (AU); Kevin Graham Doole, Alderley (AU)

(73) Assignee: QUICK GRIP STAPLES (HK) LIMITED, Hong Kong (HK)

( * ) Notice: Subject to any disclaimer, the term of this patent is extended or adjusted under 35 U.S.C. 154(b) by 30 days.

(21) Appl. No.: 14/426,990

(22) PCT Filed: Sep. 10, 2013

(86) PCT No.: PCT/AU2013/001024
§ 371 (c)(1),
(2) Date: Mar. 10, 2015

(87) PCT Pub. No.: WO2014/036614
PCT Pub. Date: Mar. 13, 2014

(65) Prior Publication Data
US 2015/0240853 A1    Aug. 27, 2015

(30) Foreign Application Priority Data

Sep. 10, 2012  (AU) ................. 2012904112
Dec. 5, 2012   (AU) ................. 2012905295

(51) Int. Cl.
*F16B 15/00*    (2006.01)
*E04B 1/26*     (2006.01)
(Continued)

(52) U.S. Cl.
CPC ............ *F16B 15/0015* (2013.01); *E04C 3/16* (2013.01); *E04C 3/17* (2013.01); *E04B 1/2608* (2013.01);
(Continued)

(58) Field of Classification Search
CPC .... F16B 15/0015; F16B 15/0046; E04C 3/16; E04C 3/17; E04C 3/14; F16L 3/13;
(Continued)

(56) References Cited

U.S. PATENT DOCUMENTS 1,833,786 A    11/1931  Maraguglio
2,236,581 A    4/1941   Schenk
(Continued)

FOREIGN PATENT DOCUMENTS

CN    2135680 Y    6/1993
CN    1477314 A    2/2004
(Continued)

OTHER PUBLICATIONS

Stainless Steel Products, Feb. 26, 2015.*
(Continued)

*Primary Examiner* — David P Bryant
*Assistant Examiner* — Lee A Holly
(74) *Attorney, Agent, or Firm* — Caesar Rivise, PC

(57) ABSTRACT

A staple includes a length of metal wire shaped to form a crown and two spikes. Each spike depends from a respective end of the crown and includes a shoulder at each end of the crown, a sharpened tip portion and an elbow interposed between each tip portion and shoulder, the elbow comprised of a proximal limb and a distal limb such that the tip portions depend from respective distal limbs. An included angle between each shoulder and the crown is between about 91° and 96°, an included angle between each proximal limb and the crown is between about 60° and 85° and an included angle between each distal limb and the crown is between about 95° and 130°.

15 Claims, 14 Drawing Sheets

(51) Int. Cl.
*E04C 3/16* (2006.01)
*E04C 3/17* (2006.01)
*F16L 3/13* (2006.01)
*F16L 3/237* (2006.01)

(52) U.S. Cl.
CPC ... *E04B 2001/2696* (2013.01); *F16B 15/0046* (2013.01); *F16L 3/13* (2013.01); *F16L 3/237* (2013.01); *Y10T 29/49616* (2015.01)

(58) Field of Classification Search
CPC .............. F16L 3/237; F16L 2001/2696; E04B 2001/2696; E04B 1/2608; Y10T 29/49616; A61B 17/8085; E02D 27/32
See application file for complete search history.

(56) References Cited

U.S. PATENT DOCUMENTS

| | | | |
|---|---|---|---|
| 4,100,395 A * | 7/1978 | Ballard | H05B 3/08 219/542 |
| 4,489,875 A * | 12/1984 | Crawford | A61B 17/0644 227/19 |
| 4,637,194 A * | 1/1987 | Knowles | E04C 3/14 411/457 |
| 4,734,003 A | 3/1988 | Smith et al. | |
| 4,802,478 A | 2/1989 | Powell | |
| 5,053,038 A * | 10/1991 | Sheehan | A61B 17/0642 606/75 |
| 5,381,649 A * | 1/1995 | Webb | A61B 17/0644 59/71 |
| 6,386,811 B2 * | 5/2002 | Almeras | F16B 15/0015 411/359 |
| 6,931,804 B2 * | 8/2005 | Trarup | E02D 27/32 52/167.3 |
| 8,083,454 B2 | 12/2011 | Doole | |
| 2001/0008601 A1 | 7/2001 | Almeras et al. | |
| 2008/0184647 A1 | 8/2008 | Yau et al. | |
| 2009/0056236 A1 | 3/2009 | Rosten et al. | |
| 2009/0087281 A1 * | 4/2009 | Doole | F16B 15/0015 411/457 |
| 2013/0231667 A1 * | 9/2013 | Taylor | A61B 17/8085 606/75 |
| 2013/0239498 A1 | 9/2013 | Owens et al. | |

FOREIGN PATENT DOCUMENTS

| | | |
|---|---|---|
| CN | 2750101 Y | 1/2006 |
| CN | 101044328 A | 9/2007 |
| DE | 1812065 U | 5/1960 |
| EP | 1108898 A1 | 6/2001 |
| JP | H09-250525 A | 9/1997 |
| WO | 2011154902 A1 | 12/2011 |

OTHER PUBLICATIONS

Supplementary European Search Report issued in respect of corresponding European Application No. 13 83 5207.
Search Report dated issued in respect of corresponding Chinese Application No. 201300585381.

* cited by examiner

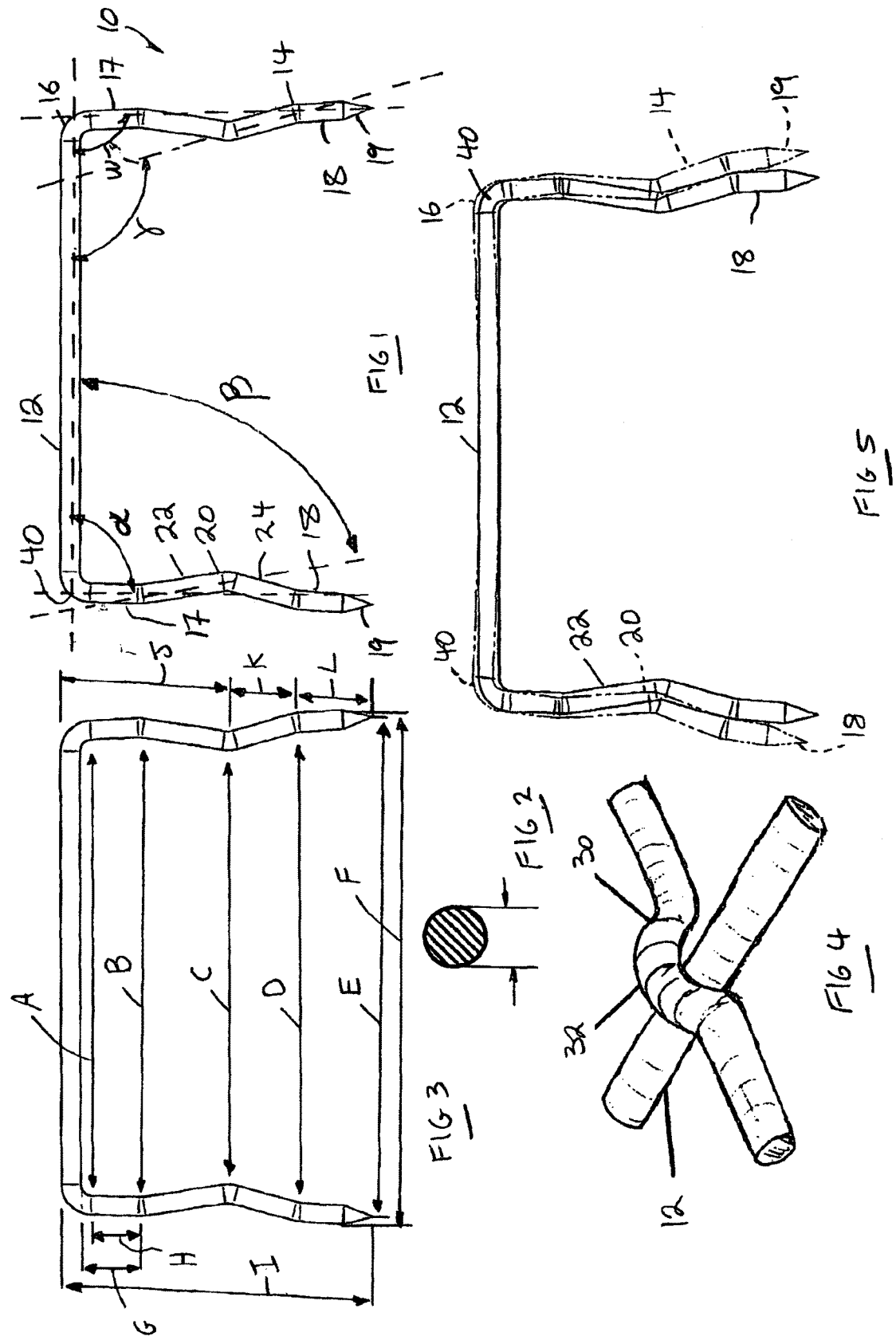

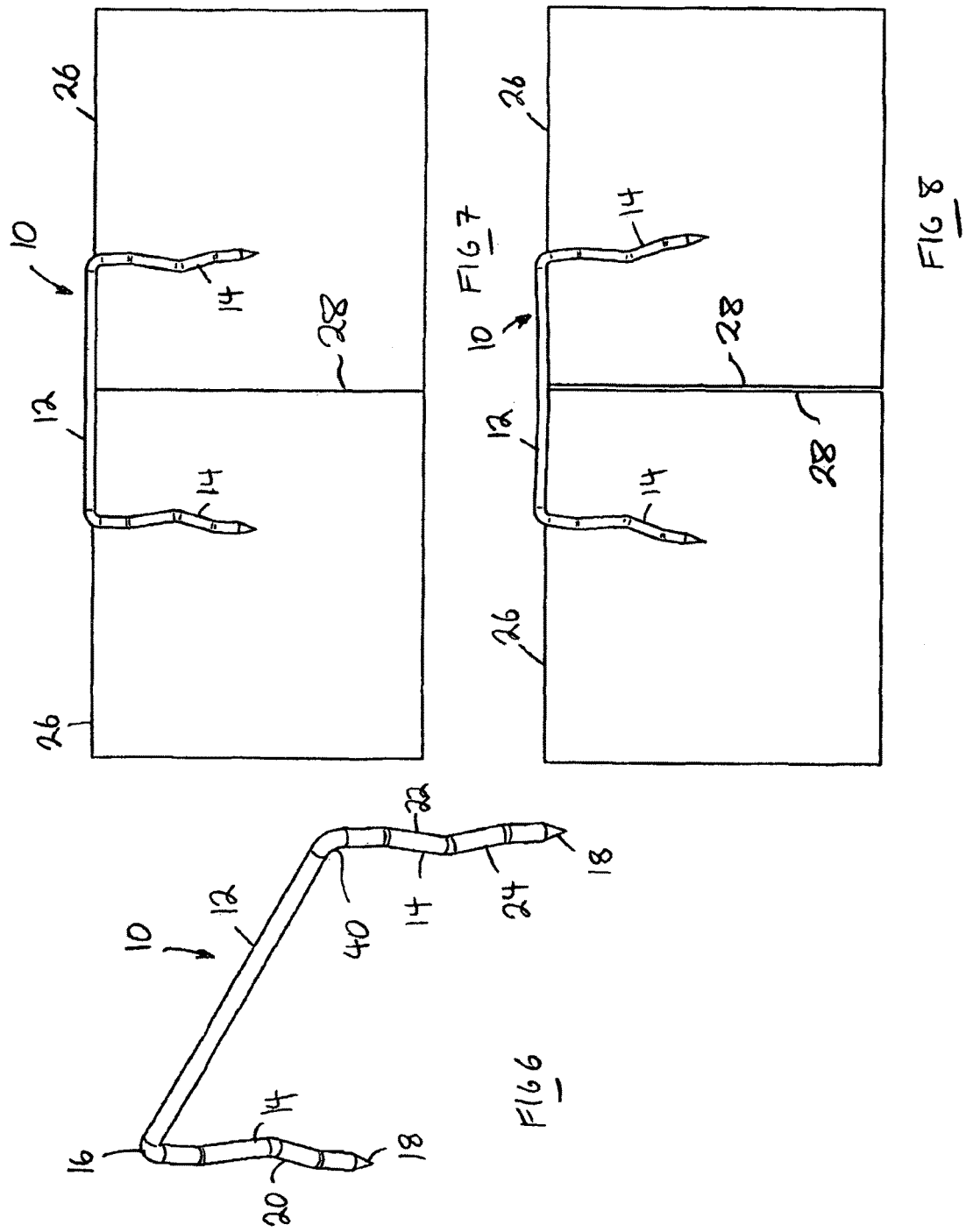

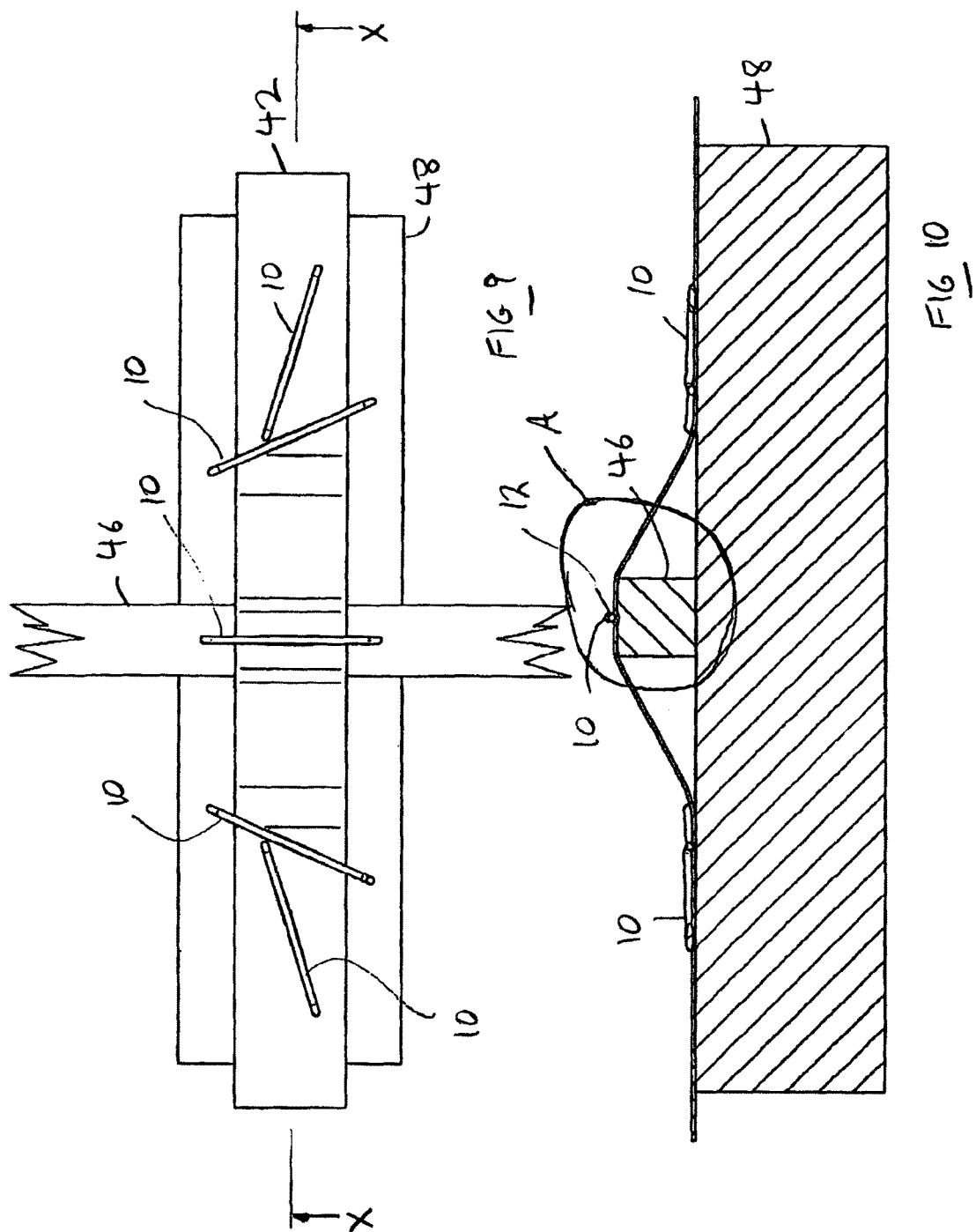

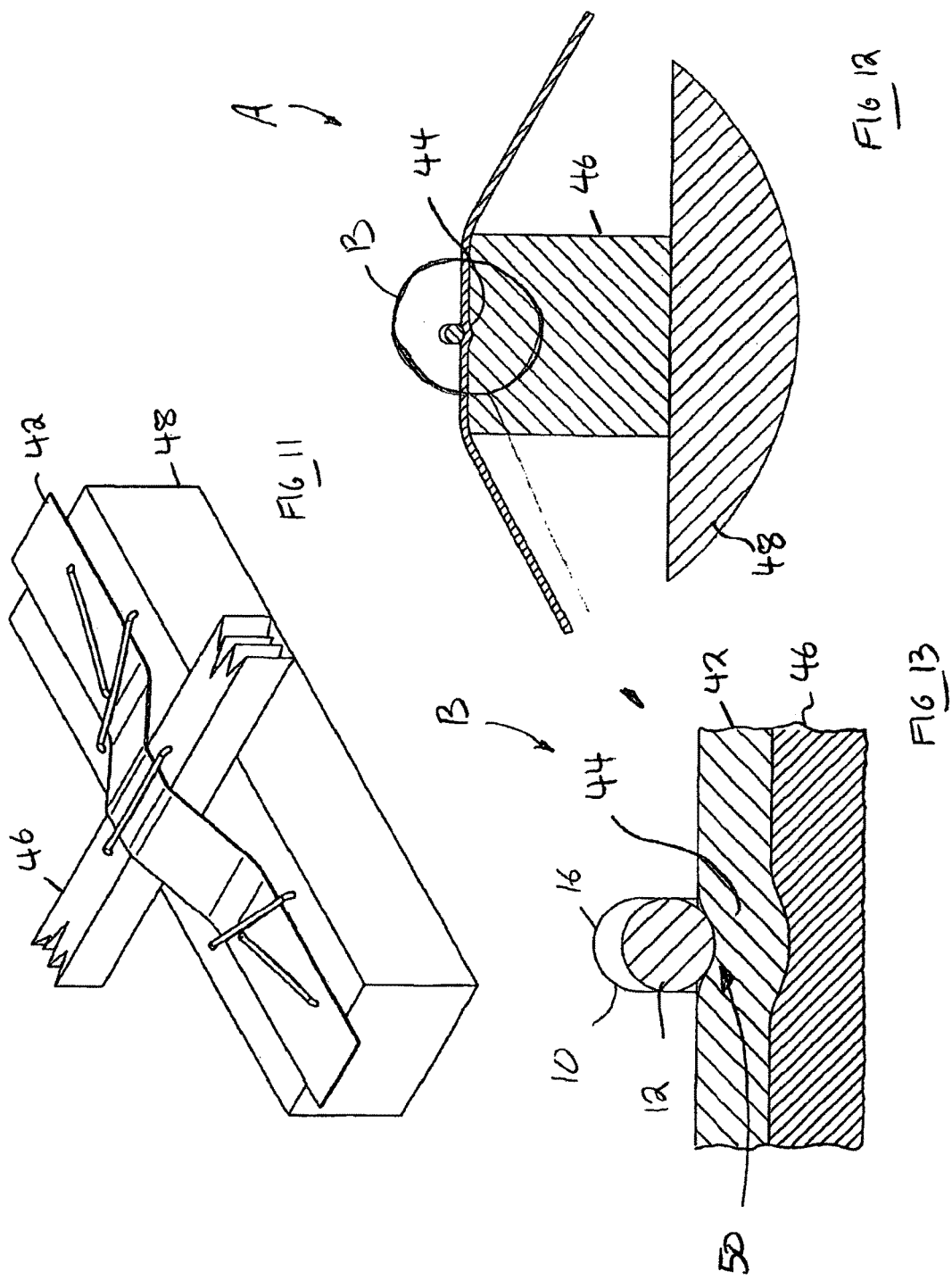

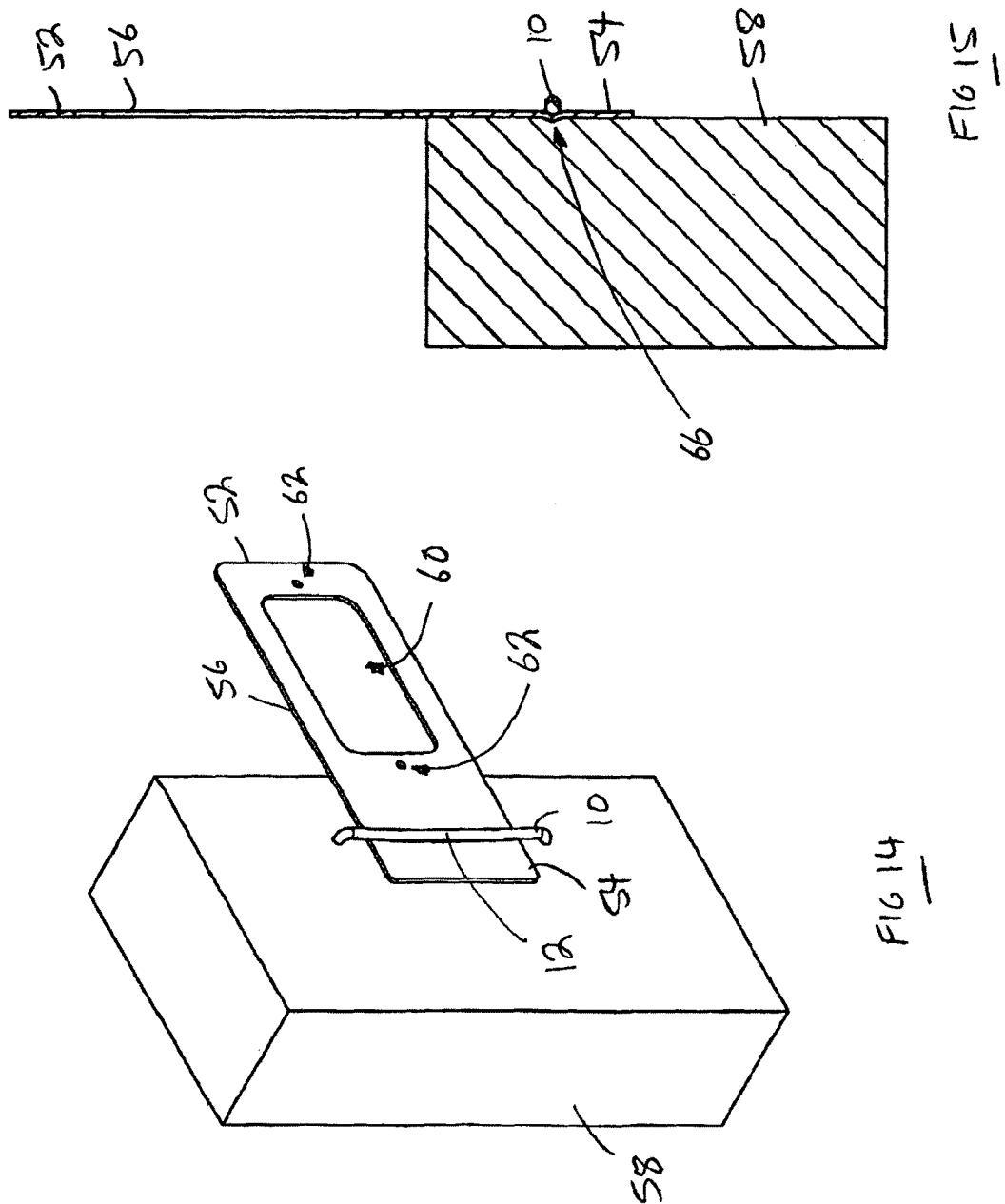

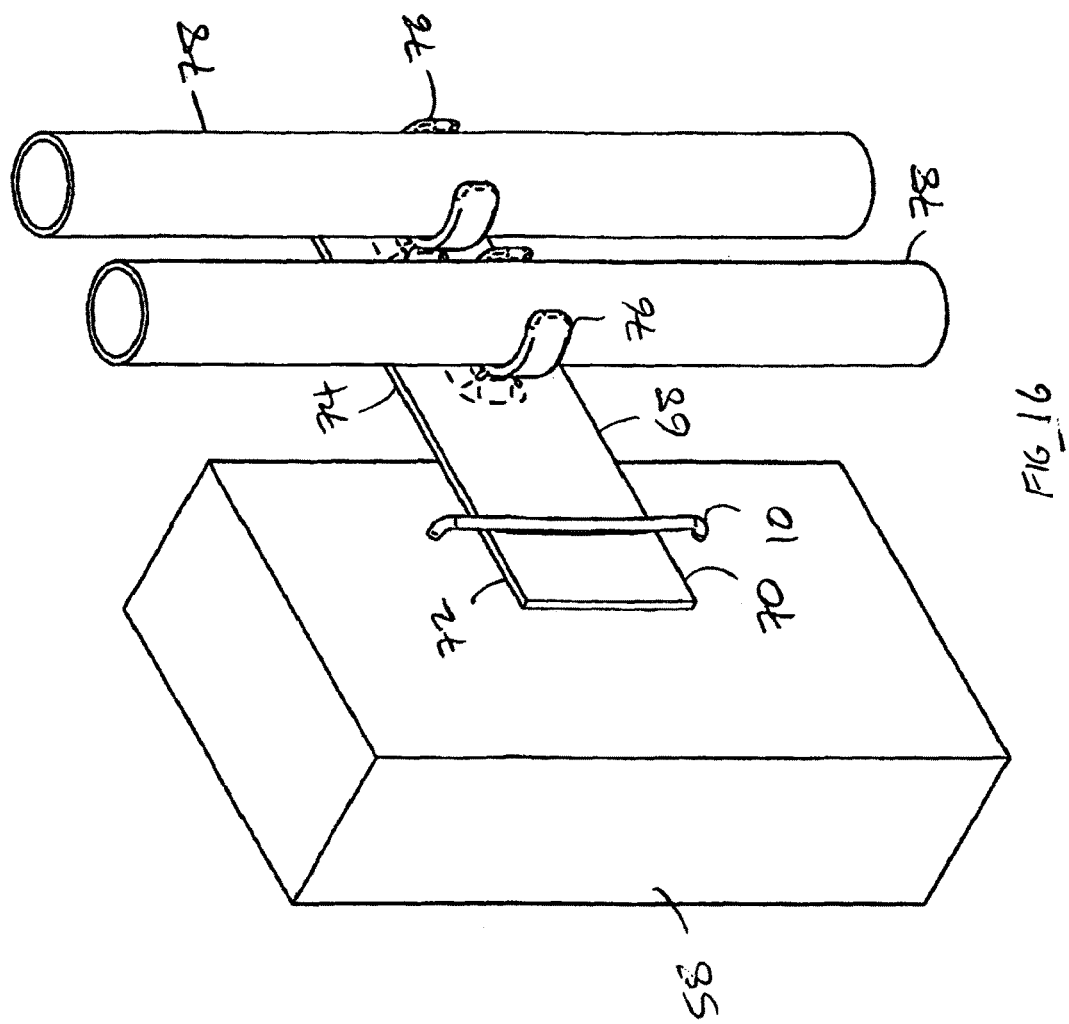

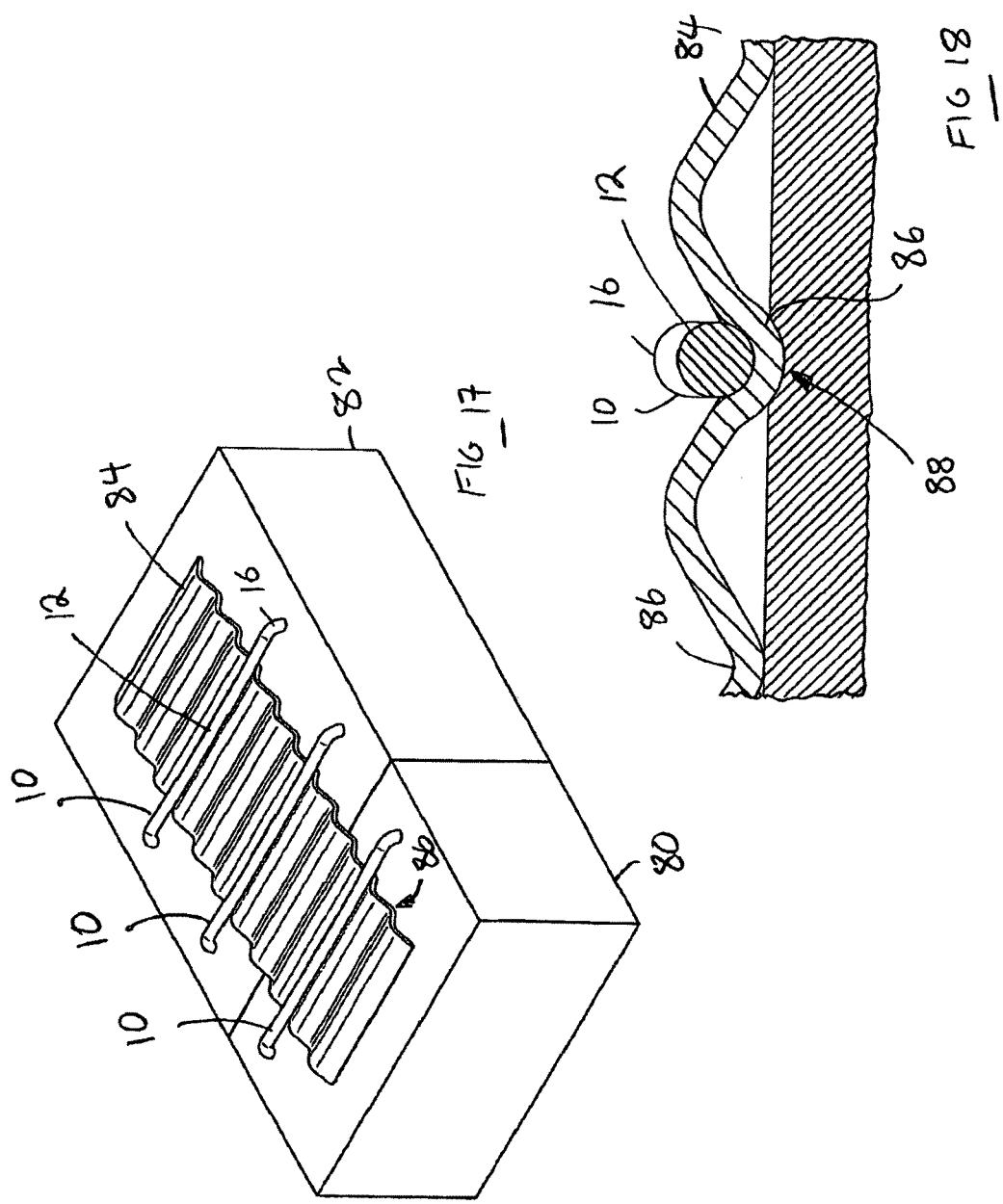

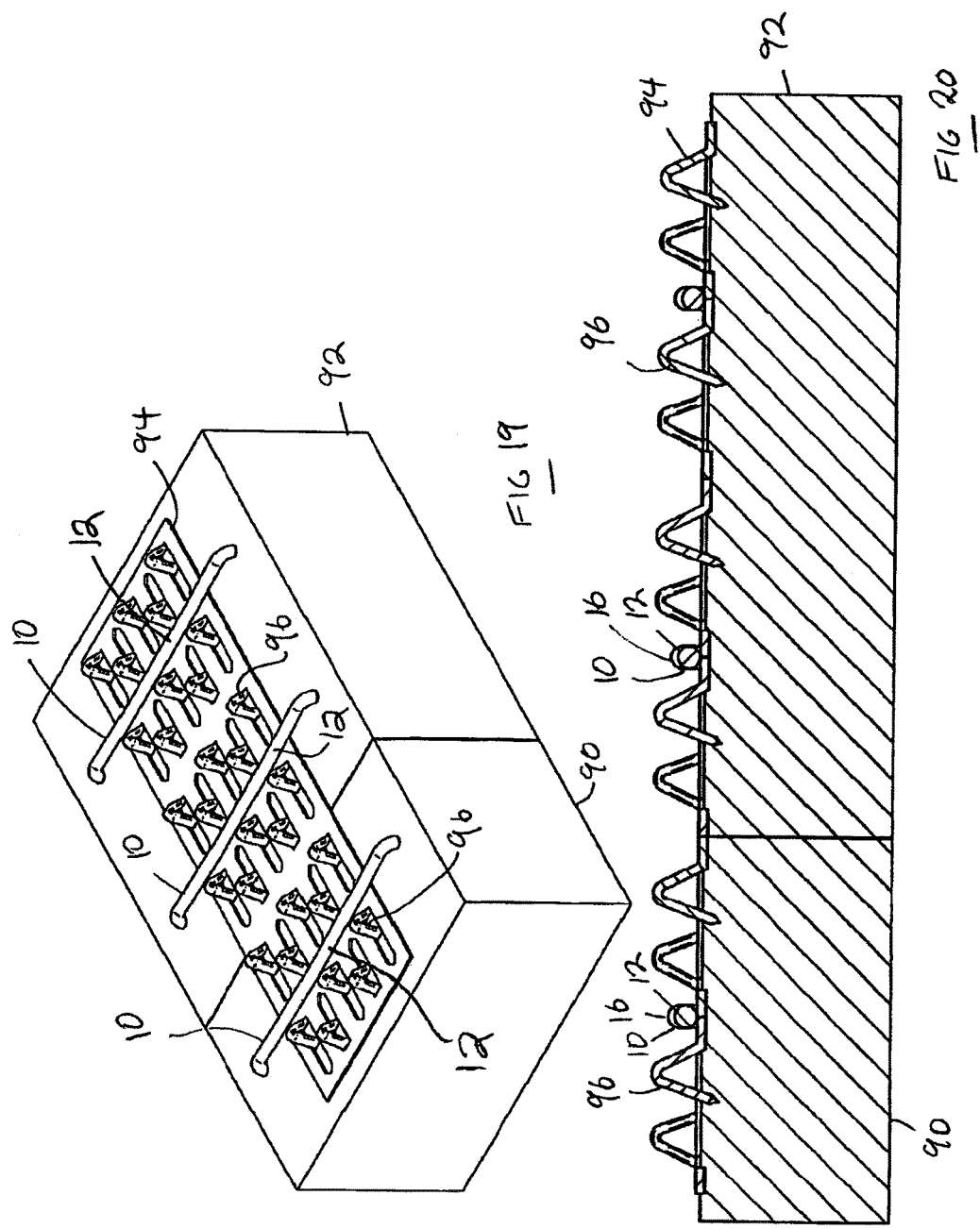

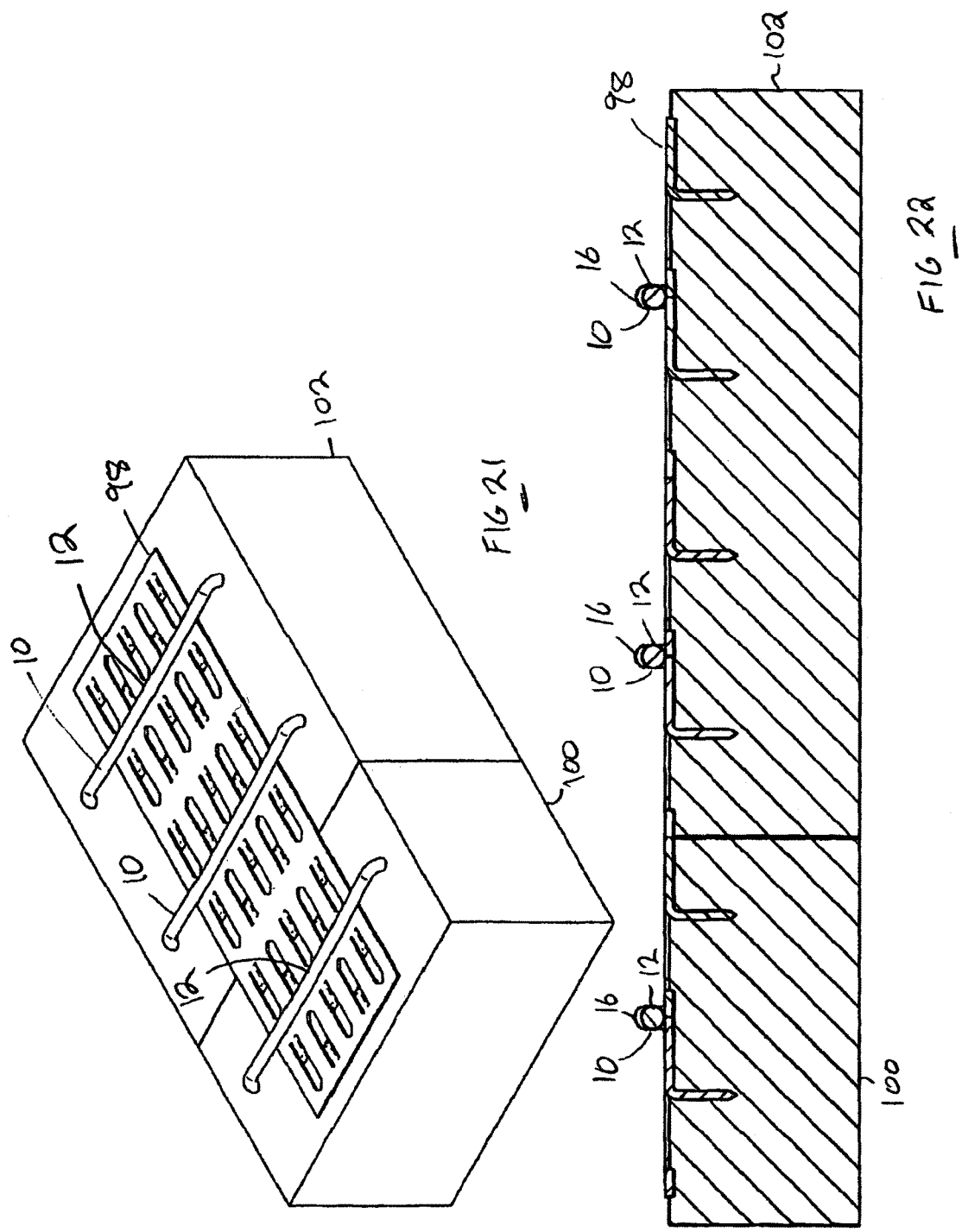

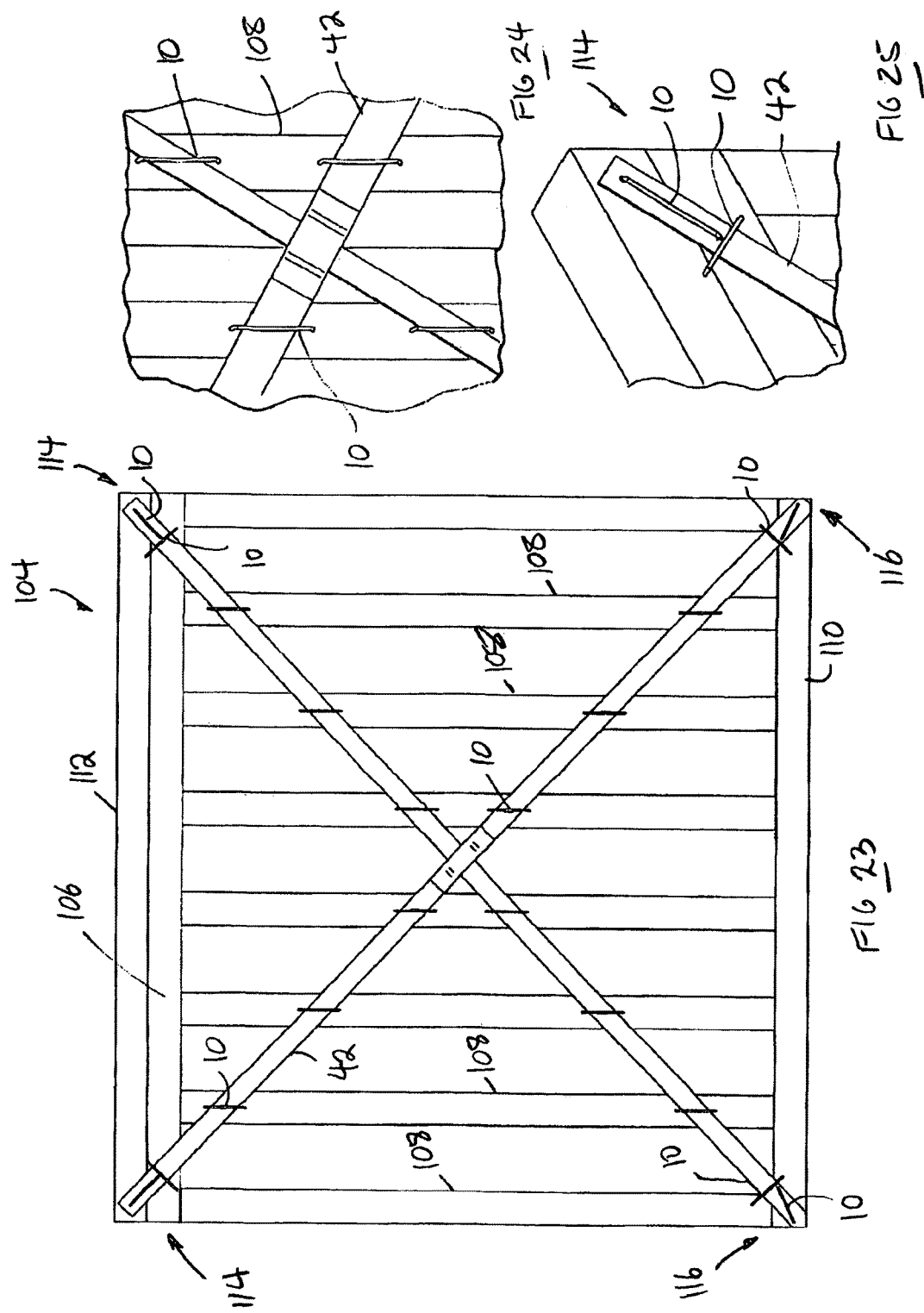

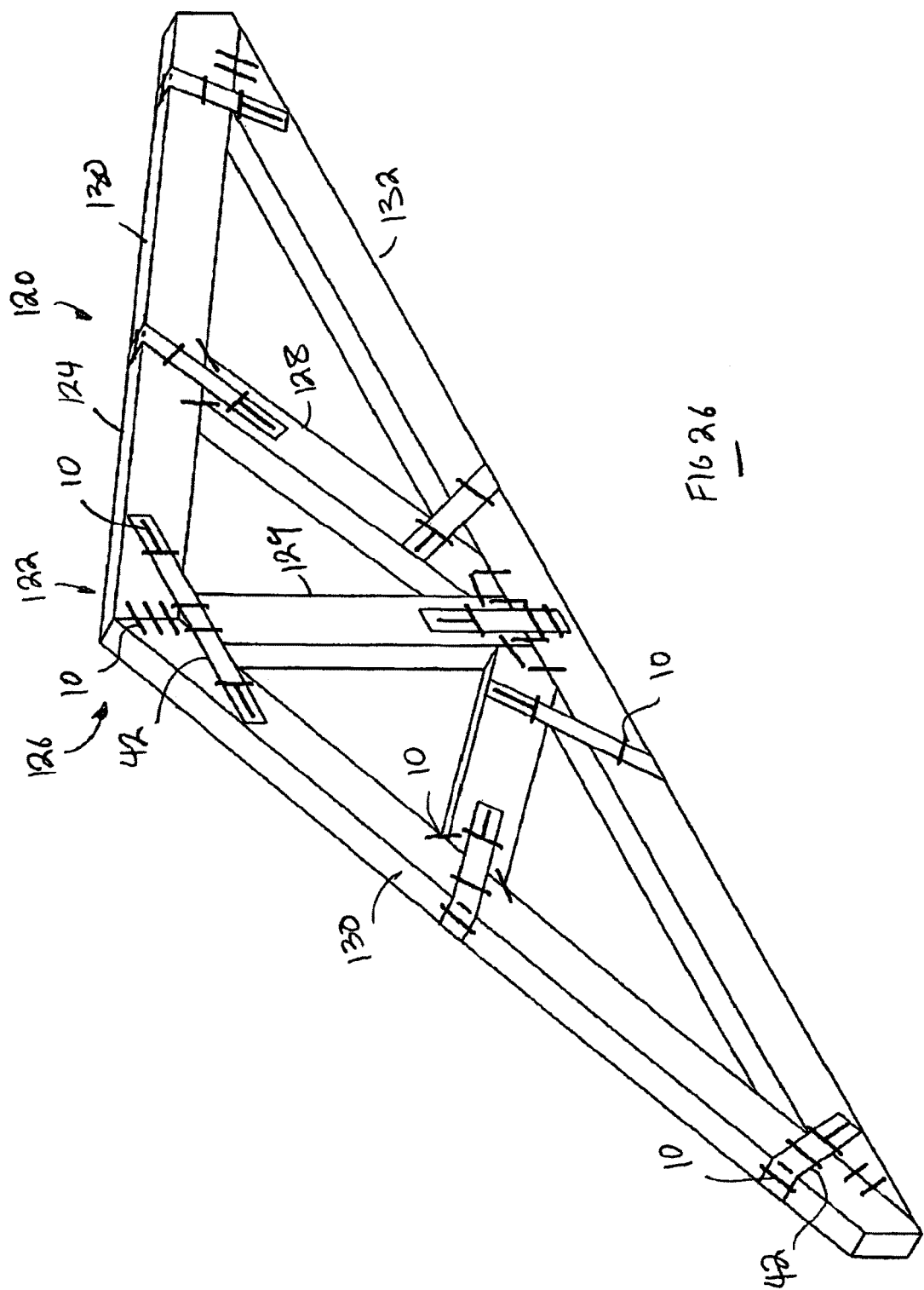

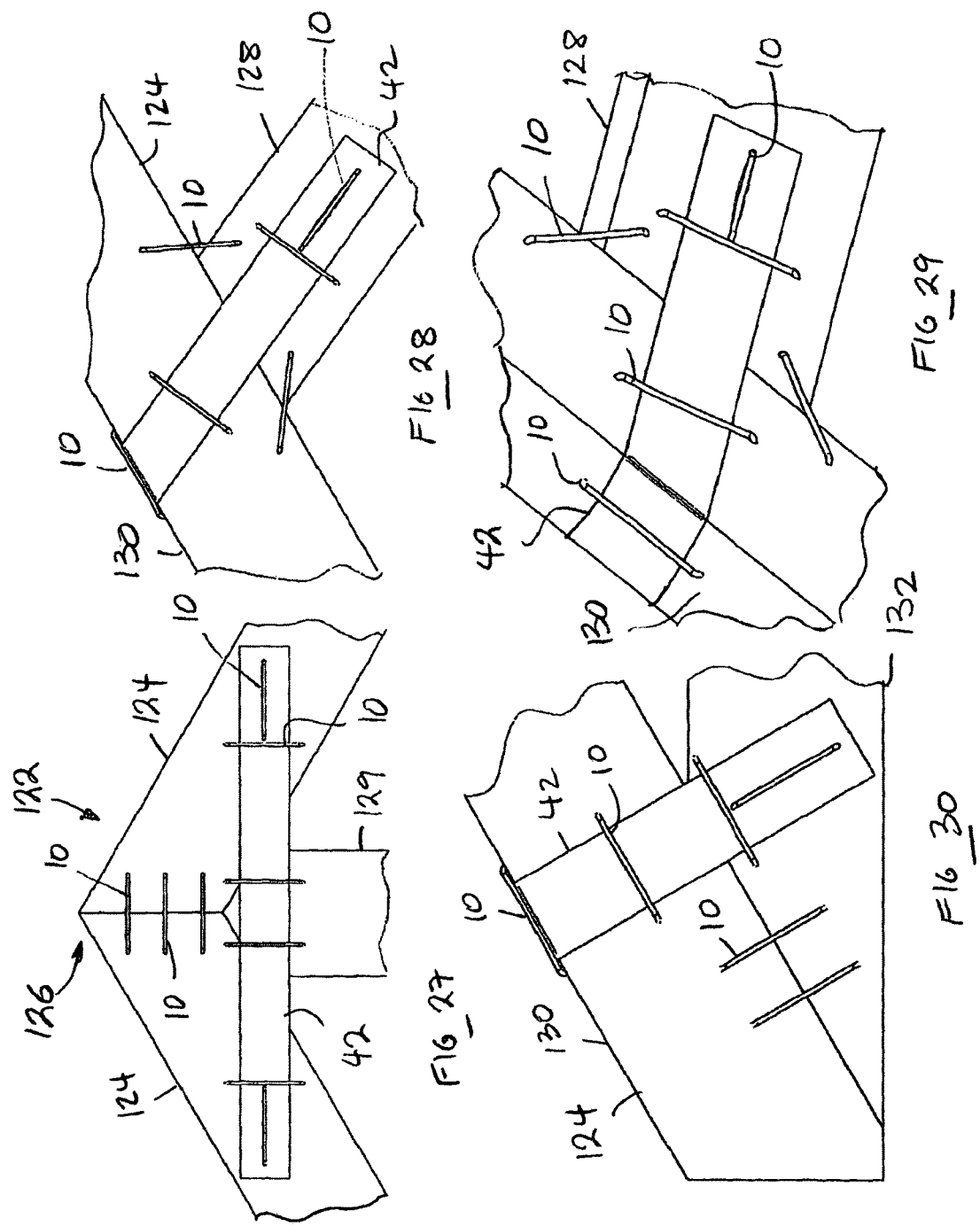

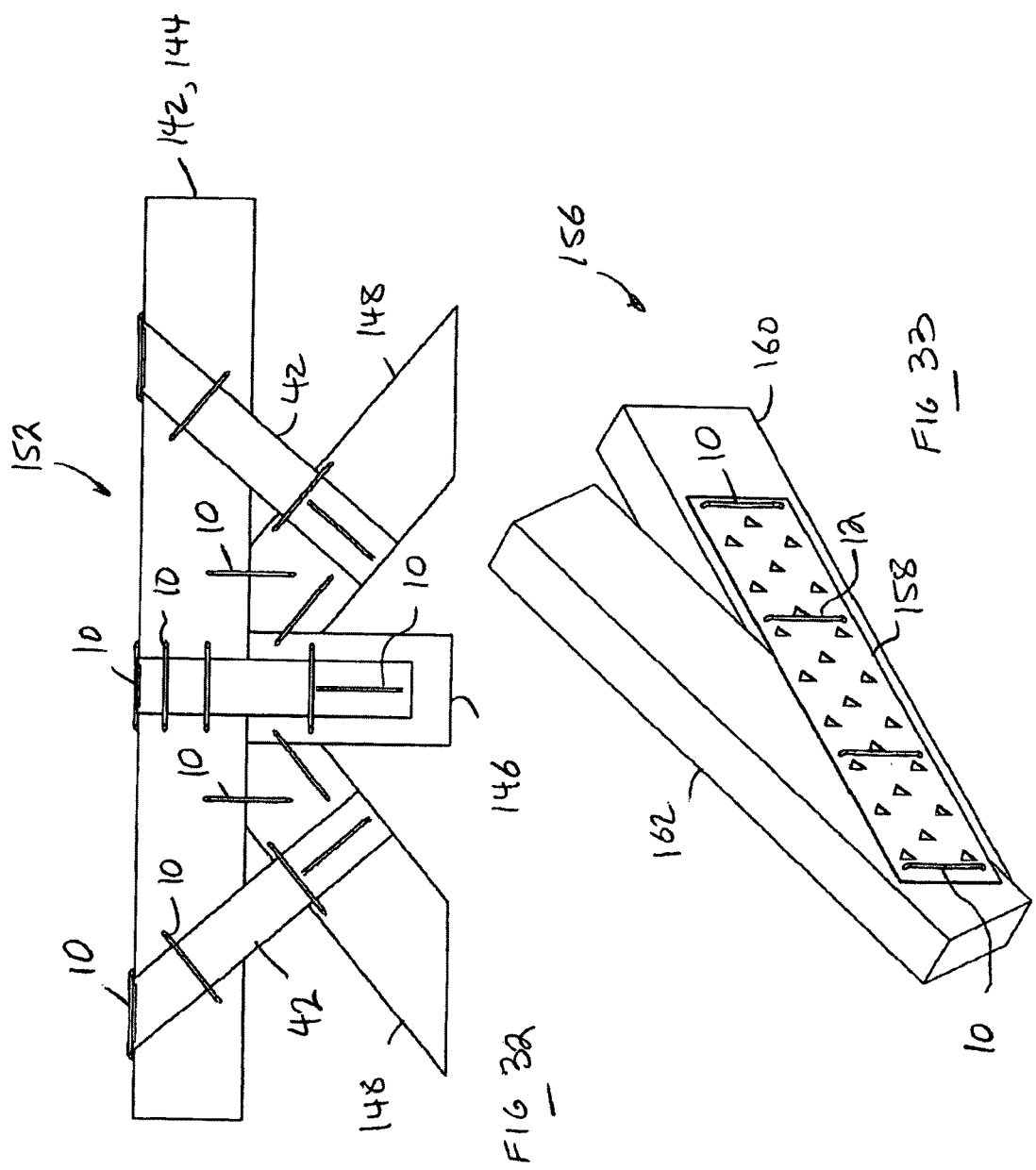

STAPLE

FIELD

Various exemplary embodiments of a staple, a method of assembling structural components and a structural assembly are described in this specification.

SUMMARY

Various exemplary embodiments of a staple comprise a length of metal wire shaped to form:
a crown; and
two spikes, each spike depending from a respective end of the crown and comprising
   a shoulder at each end of the crown;
   a sharpened tip portion; and
   an elbow interposed between each tip portion and shoulder, the elbow comprised of a proximal limb and a distal limb such that the tip portions depend from respective distal limbs, wherein
an included angle between each shoulder and the crown is between about 91° and 96°, an included angle between each proximal limb and the crown is between about 60° and 85° and an included angle between each distal limb and the crown is between about 95° and 130°.

An included angle between each tip portion and the crown may be approximately 90°. However, other angles between about 85° and 95° can also be appropriate.

It is to be noted here that the words "proximal" and "distal" are used with reference to the crown for convenience only and are not, intended to limit the scope of the above paragraphs or the claims.

The staple finds particular application for the connection of structural timber elements such as joists and trusses. However, the staple can be used in many other applications where it is required to join components together. In such applications, it is common for a fastening gun to be used to drive the staple into the timber. The inventor(s) has also conceived an accessory for a fastening gun suitable for use with these staples. The inventor(s) has found that the above defined angles when applied to a length of wire of suitable length and thickness dimensions provide effective connection when driven into timber elements or components with a fastening gun.

The wire can be of different metals, provided they have sufficient tensile strength. For example, the metal of the wire can be selected to have yield strength of not less than 1300 MPa. The metal of the wire can be selected to have yield strength of between 1300 MPa and 1800 kPa. It will be appreciated that a thickness of the wire must be taken into account when selecting a suitable metal. For example, the wire can have a diameter of between 2 mm and 6.5 mm when using high tensile steel. However, should it be necessary to use stainless steel, the diameter should be increased by about 0.5 mm.

The lengths of the crown, bends at the shoulders, the proximal limbs, the distal limbs and the tip portions can vary depending on the application of the staple.

The relative angles of the various components of the staple are such that as the staple is driven into adjoining workpieces with a fastening gun, the spikes are urged apart. As a result, the crown is bowed into the adjoining workpieces. This sets up a pre-tension in the staple and pressure between abutting faces of the adjoining workpieces.

Various exemplary embodiments of a method of fastening structural components together or assembling a structure include the step of driving a staple as described above into two structural components such that each spike is driven into a respective component and the crown is as at least partially embedded in the timber.

Various exemplary embodiments of a method of fastening structural components together or assembling structural components make use of a staple having a length of metal wire shaped to form a crown and two spikes, each spike depending from a respective end of the crown and comprising a shoulder at each end of the crown, a sharpened tip portion, an elbow interposed between each tip portion and the shoulder and the elbow comprised of a proximal limb and a distal limb such that the tip portions depend from respective distal limbs, the method comprising the steps of:
   positioning a connecting member on adjacent structural components; and
   driving the spikes of at least one of the staples into each component so that the crowns of the staples are at least partially embedded in the components with a portion of the connecting member interposed between each crown and one of the components.

Thus, the components are held together by the connecting member bridging the components.

The connecting member may be a strip of metal. For example, the connecting member may be a strip of galvanised steel. The strip may be corrugated so that the crowns can nest in respective troughs defined by the strip. Thus, a portion of the trough can also be driven into the structural component.

Various exemplary embodiments of a truss assembly or any other form of structural assembly are fabricated or assembled using the methods described herein.

Various exemplary embodiments of a method of refurbishing a joint that includes a connector fastened to components of the joint make use of a staple having a length of metal wire shaped to form a crown and two spikes, each spike depending from a respective end of the crown and comprising a shoulder at each end of the crown, a sharpened tip portion, an elbow interposed between each tip portion and shoulder and the elbow comprised of a proximal limb and a distal limb such that the tip portions depend from respective distal limbs, the method comprising the step of driving the spikes through the connector and into the components.

DESCRIPTION OF THE DRAWINGS

FIG. 1 shows an exemplary embodiment of a staple with angular dimensional indicators.

FIG. 2 shows a cross-section of a wire used in the fabrication of the staple.

FIG. 3 shows the staple with linear dimensional indicators.

FIG. 4 shows an exemplary embodiment of two staples used together for fastening.

FIG. 5 shows the staple and illustrates an example of an extent of elastic deformation of the staple as it is driven into one or two workpieces or components.

FIG. 6 shows a three-dimensional view of the staple.

FIG. 7 shows a schematic section view of workpieces connected together with the staple.

FIG. 8 shows a schematic section view of workpieces connected together with the staple, the workpieces being separated under load.

FIG. 9 shows a plan view of two workpieces connected together with a number of the staples and a strip of metal.

FIG. 10 shows a side section view taken through X-X in FIG. 9.

FIG. 11 shows a three-dimensional view of the two workpieces connected together as shown in FIG. 9.

FIG. 12 shows a detailed cross-sectional view of part A in FIG. 10.

FIG. 13 shows a detailed cross-sectional view of part B in FIG. 12.

FIG. 14 shows a three-dimensional view of a bracket connected to a structural component with the staple.

FIG. 15 shows a section view, from above, of the bracket connected to the structural component.

FIG. 16 shows a three-dimensional view of a conduit holder connected to a structural component with the staple.

FIG. 17 shows a three-dimensional view of a corrugated elongate metal connector used to connect two workpieces together with the staple.

FIG. 18 shows a section view of part of the connector of FIG. 17 and the staple.

FIG. 19 shows a three-dimensional view of one form of timber connector used to connect two workpieces together with the staple.

FIG. 20 shows a section view of part of the connector of FIG. 19 and the staple.

FIG. 21 shows a three-dimensional view of another form of timber connector used to connect two workpieces together with the staple.

FIG. 22 shows a section view of part of the connector of FIG. 21 and the staple of FIG. 1.

FIG. 23 shows a three-dimensional view of a wall frame assembly fabricated using elongate metal strips and the staples.

FIG. 24 shows a detailed view of a part of the wall frame assembly.

FIG. 25 shows a detailed view of another part of the wall frame assembly.

FIG. 26 shows a three-dimensional view of a roof truss assembly fabricated using elongate metal strips and the staples.

FIG. 27 shows a hip joint of the roof truss assembly.

FIG. 28 shows a diagonal member of the truss assembly connected to a roof rafter of the truss assembly.

FIG. 29 shows a three-dimensional view of the roof rafter and diagonal member connected together.

FIG. 30 shows a ceiling rafter of the truss assembly connected to a roof rafter of the truss assembly.

FIG. 32 shows a joint of the parallel chord assembly.

FIG. 33 shows a joint fabricated or refurbished using the staples and a conventional plate connector.

DESCRIPTION OF EMBODIMENTS

Figure 31:
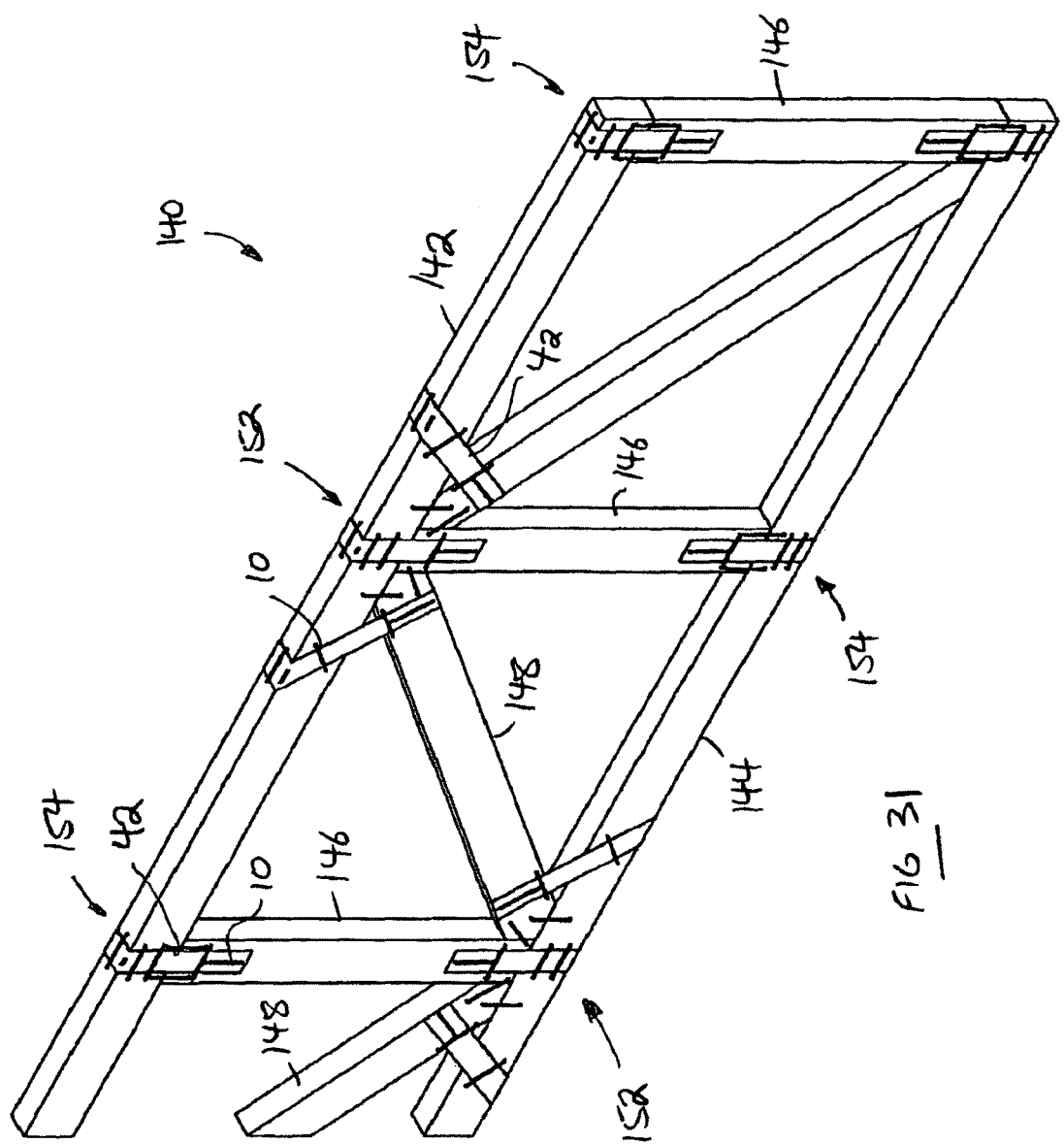
FIG. 31 shows a parallel chord assembly fabricated or refurbished using the staples and the strips.

In the drawings, reference numeral 10 generally indicates an exemplary embodiment of a staple. The staple 10 is configured for being driven into one or two workpieces of timber. The workpieces of timber can be structural components of a structural assembly, such as a truss assembly, parallel chord assembly, wall assembly or any other similar assemblies used in timber construction.

The staple 10 is formed from a length of round metal wire, a cross-section of which is shown in FIG. 2. However, the staple 10 can also be formed from a length of metal wire with a different cross-sectional shape, such as rectangular or oval. The metal in question can take a number of different forms. In one example, the metal can be in the form of high tensile steel. In that case, the steel is selected to have a yield strength of at least 1300 MPa. For example, the steel is selected to have a yield strength of between about 1300 MPa and 1800 MPa. In that case, as shown in FIG. 2, the wire can be round and can have a diameter of between about 2 mm and 7 mm, depending on the required application. In some cases, it may be necessary for the wire to be of stainless steel. Then, the diameter can be increased by about 0.5 mm to 1 mm. These ranges are to be interpreted as being fully inclusive of all the values between the limits.

The length of metal wire is shaped to define a crown 12 and two spikes 14 depending from respective ends of the crown 12. Each spike 14 includes a shoulder 16 at each end of the crown 12 and a tip portion 18 sharpened at 19. The shoulder 16 includes a portion 17 that depends from the crown 12. A knuckle or elbow 20 is interposed between each tip portion 18 and each depending portion 17. Each elbow 20 has a proximal limb 22 depending from the portion 17 and a distal limb 24 depending from the proximal limb 22 such that the tip portion 18 depends from the distal limb 24.

The length of metal wire is shaped so that when the spikes 14 are driven into the workpiece(s), the spikes 14 are urged away from each other causing the crown 12 to bow. As a result, a bending moment static tension is set up in the crown 12. In other words, the crown 12 is pre-tensioned. The significance of this is explained below.

The functionality of the staple 10 is provided primarily by the three angles shown in FIG. 1. An included angle $\alpha$ is defined by a longitudinal axis of the crown 12 and a longitudinal axis of the portion 17. An included angle $\beta$ is defined by a longitudinal axis of the crown 12 and a longitudinal axis of the proximal limb 22. An included angle $\gamma$ is defined by a longitudinal axis of the crown 12 and a longitudinal axis of the distal limb 24. An included angle $\omega$ is defined between the longitudinal axis of the crown 12 and a longitudinal axis of the tip portion 18.

Generally, $\alpha$ is between about 91° and 96°, $\beta$ is between about 60° and 85°, $\gamma$ is between about 95° and 130° and $\omega$ is between about 85° and 95°. The inventor(s) envisages that these angles can be any value between the above ranges. For example, $\alpha$ is about 93°, $\beta$ is about °, $\gamma$ is about 117° and $\omega$ is about 90°.

The inventor(s) has found that these angles have particular utility when the staple 10 is driven into workpiece components 26 (FIG. 4) with a fastening gun. The combination of the angles and the material of the wire results in the spikes 14 being urged apart as they are driven into the workpiece components 26. This causes the crown 12 to be bowed towards and usually partially into the components 26. This pre tensions the staple 10 and serves to generate a clamping pressure between abutting faces 28 of the components 26. Furthermore, the elbows 20 serve to inhibit the staple from being withdrawn from the components 26.

The staple 10 is useful for connecting timber components, such as those used for erecting buildings. It is desirable that some degree of movement be accommodated between connected components. The fact that the staple 10 resists withdrawal from the components 26 allows repetitive, temporary separation of the abutting faces 28 with minimal damage to the components or the staple 10. Thus, the staple 10 is particularly useful for erecting structures in areas of extreme weather. It will be appreciated that a structural frame assembled using the staple 10 will be capable of undergoing repeated structural distortion with a minimal amount of permanent damage.

The lengths of the various component parts of the staple 10 can vary depending on the application. For example, the staple 10 is useful for connecting the timber components 26 in the form of truss members or any other timber members or components that are used on a large-scale in erecting buildings. Such timber components usually have a standard size.

In FIG. 3, various linear dimensions of an embodiment of the staple 10 are shown. Use of the terms "horizontal" and "vertical" are to be understood as being used solely for convenience. Thus, the term "horizontal" refers to a plane that is parallel to a longitudinal axis of the crown 12, while the term "vertical" refers to a plane that is orthogonal to the horizontal plane.

With reference to the labels used in FIG. 3, the following table sets out a number of exemplary dimensions indicated by the labels.

| | |
|---|---|
| A | 55 mm to 65 mm, for example 60 mm |
| B | 55 mm to 65 mm, for example 60.64 mm |
| C | 52 mm to 62 mm, for example 57 mm |
| D | 57 mm to 67 mm, for example, 62 mm |
| E | 60 mm to 70 mm, for example, 65 mm |
| F | 65 mm to 75 mm, for example, 70 mm |
| G | 3 mm to 13 mm, for example, 8 mm |
| H | 1 mm to 11 mm, for example, 6 mm |
| I | 34 mm to 44 mm, for example, 39 mm |
| J | 15 mm to 25 mm, for example, 20 mm |
| K | 4 mm to 14 mm, for example, 9 mm |
| L | 5 mm to 15 mm, for example, 10 mm |

It is to be noted that the above dimensions are those of just one particular example of this embodiment of the invention. Furthermore, the inventor(s) envisages that the above dimensions can vary without loss of functionality. For example, all the dimensions set out above can be scaled upwardly for thicker wire or downwardly for thinner wire with higher yield strength.

Also, the ratio of the length of the crown to the length of the spikes can vary from about 1.5:1 to 4.5:1, for example, from about 2:1 to 4:1. The inventor(s) has found that if the crown is too long relative to the spikes, the load will not be carried evenly by both spikes. Also, the inventor(s) has found that if the crown is too short relative to the spikes, the extent of bowing or flexing is insufficient to accommodate the repetitive, temporary separation of the abutting faces 28 with minimal damage to the components or the staple 10.

It will be appreciated that a wire thickness selection should be such that the bowing or flexing can occur. For example, when scaling upwardly for heavier timber elements, the relative dimensions set out above will be affected by the thickness of the wire.

In use, as the tip portions 18 are driven into the components 26, they tend to spread apart and therefore set up a tension in the wire which serves to urge the components 26 together. As the elbows 20 penetrate the timber, the tension is further increased and so is the pressure between the abutting faces 28. As a result of this, the angle α increases by up to 5°, or even more in some cases. As mentioned above, this causes the crown 12 to bow. As the staple 10 is driven home, the crown 12 can be partially embedded into the timber and the dimension E is increased to greater than the overall width of the staple 10, prior to insertion. In that condition, there are three regions or zones of tension set up in the staple 10. The first region is at or about the tip portions 18; the second is at or about the elbows 20 and the third is at or about the shoulders 16.

The angles described above result in a staple 10 that is capable of resisting plastic deformation, either by way of crumpling, or some other mechanism, when being inserted or driven home with a fastening gun. Furthermore, the relative angles are selected so that spike run-off during insertion is inhibited or avoided.

As mentioned above, the dimensions of the staple 10 are selected to correspond with the dimensions of the timber components 26. In particular, the length of the spikes 14 are selected so that when the staple 10 is driven into the components 26, a pressure across the abutting faces is generally consistent, thereby inhibiting the separation of the abutting faces at a location distal with respect to the crown 12.

An embodiment of the staple has a crown 30 that is bent at 32 to accommodate the crown 12 of the staple 10 (FIG. 4). The spikes of this staple are the same as the spikes 14. This staple can be driven into the timber components 26 with the crown 30 overlaying the crown 12, with the bend 32 accommodating the crown 12. Thus, when necessary, a joint between the components 26 can be reinforced. It will be appreciated that the crown 12 and crown 30 can be configured to be connected in any other manner, if necessary, to achieve a similar connection.

An embodiment of the staple 10 finds use in reinforcing existing joints. For example, it is common practice to use gang-nail connectors that are embedded into abutting workpieces, for example, timber components. A gang-nail connector is a steel plate with a collection of spikes or nails projecting from one face. The spikes or teeth are formed by punching slots in steel, but leaving one end of a resultant "plug" connected to the sheet. The teeth or spikes are formed to extend generally at right angles to the sheet or plate. The punching die forms the teeth so that they are sharp and can penetrate into the timber components. The connectors are used in pairs, with one or more connectors pressed into each respective side of a joint. In use, the plates are usually rolled into the sides of the joint.

The spikes or teeth of such connectors are usually about 10 mm long. It has been found that joints formed with such Connectors can lose up to 50% of their strength if more than 0.5 mm of the spikes or teeth is withdrawn from the timber.

Over time, these connectors can rust and deteriorate. It is possible to drive the staple 10 through these connectors to secure and reinforce the existing joint. This will result in the spikes or nails of the connectors being retained fully in the timber. Thus, it is not necessary to waste time removing the connectors. Since a gun is used to drive the staples 10 home, reinforcing the timber joints can take place quicker than removing the connectors and replacing them. Thus, there is provided a method of reinforcing timber joints by driving the spikes 14 through the connectors to reinforce or refurbish timber joints.

It is also known that when such a connector needs to be replaced or re-fixed, it is necessary for all the components of the timber assembly to be correctly aligned prior to replacing or re-fixing the connector. This means that the timber components need to fit flush with each other prior to replacing or re-fixing the connector(s). Use of the staple 10 results in the tension set up in the staple 10, as described above, serving to draw the components towards each other. Thus, the staple 10 can be used to pull back together the timber members of a failed joint that have separated by up to 2 mm.

Furthermore, the staple 10 can be used to retain the timber members in an appropriate position relative to each other and against each other while the connector is fixed to the joint. As a result, use of the staple 10 can result in the refurbishment or establishment of a timber joint without the need for equipment such as jigs and a significant saving of time when compared with refitting or refurbishment without the staples 10.

Also, in one fabrication method, the staples 10 can be used to position the timber members correctly relative to each other. As has been set out above, the staple 10 can serve to urge abutting faces into bearing engagement with each other. Thus, the staple 10 can retain the timber members in a pre-loaded or prestressed condition relative to each other. Then, conventional connectors, such as knuckle plates or gang nail plates can be used in a conventional manner further to fasten the timber members to each other. For added strength, the staples 10 can also be driven through such conventional connectors and into the timber further to inhibit deterioration of the resultant joints. It is to be appreciated that this method can be used for the fabrication of any number of different types of structural assemblies.

In many jurisdictions, a separation force of 8 kN is required between timber components. The inventor(s) has found that four of the staples can be used to provide a joint with a 10 kN separation force.

The staple can be corrosion-resistant. For example, the staple can be galvanised. In particular, the staple 10 can be hot-dip galvanised. Also, as mentioned above, the staple 10 can be of stainless steel.

In FIG. 8, there is illustrated the manner in which the staple is elastically deformed when the workpieces 26 are separated under load and in FIG. 7 there is illustrated the manner in which the workpieces are relatively positioned once the load is removed. As the workpieces or timber components 26 are separated, for example when a building is placed under stress, the crown 30 flexes or bends towards or into the components 26. Thus, a bending moment load or stress set up in the staple 10 is primarily taken on or accommodated in the crown 12. The same applies to a torsional load applied to the staple 10 as the workpieces twist relative to each other. This serves to inhibit excessive bending at the shoulders 16. Thus, work hardening in the staple 10 is kept to a minimum.

The inventor(s) has found that when the joint defined by the components 26 is subjected to repeated stress events the knuckles or elbows 20 tend to bed more firmly into the timber and so become even more difficult to withdraw.

The inventor(s) has found that the joint does not lose strength once it moves back into the condition shown in FIG. 4.

The fact that the joint does not lose strength and the fact that the joint returns to a starting condition, subsequent to a load cycle, allows the joint to undergo proper or standardised load tests. An example of such a load test would result in the conditions set out in FIGS. 7 and 8, repetitively. It will readily be understood that it is not possible to carry out such a load test on a joint using a conventional connector, such as the gang nail connector described above. The reason is that the connector would not facilitate or accommodate such repetitive load cycles.

Furthermore, the fact that the joint can undergo such load tests allows a design load to be defined for the joint. For example, a number and position of staples can be used with a particular joint. The load characteristics of the joint can be tested to obtain a design load for that particular joint configuration.

The relative orientations of the components of the staple 10 permit the staple 10 to be driven into the workpiece(s) in such a way that the tip portions 18 enter the workpiece substantially at 90° to a surface of the workpiece. Furthermore, the relative orientations are such that deviation of the tip portions 18 relative to each other are kept at an extent to which such deviation can be accommodated by bowing or flexing of the crown 12. As mentioned above, this can avoid work hardening of other parts of the staple 10, such as regions at the shoulders 16.

The staple 10 is useful for being driven into an end grain section of timber. It is to be appreciated that conventional fasteners that are driven into an end grain section can often be withdrawn relatively easily given the nature of the end grain. The inventor(s) has found that once the spikes 14 have been driven into end grain sections, they resist withdrawal due to the configuration of the spikes 14, particularly the nature of the elbows 20 and the pre-stressing of the joint resulting from bowing or flexing of the crown 12. The inventor(s) has found that when loads are applied to the joint, and the staple 10 flexes, as described above, the elbows 20 tend to bury themselves into the timber, further resisting withdrawal. This is a significant advantage over fasteners such as end plates that are hammered into end grain sections. As a result, use of the staple 10 inhibits the problems associated with end grain failure.

The characteristics of the staple 10, described above, allow them to be useful for assembling timber products, such as pallets that are often subjected to impact and other stresses.

As is known, wood fibre consists of a primary wall enveloped in lignin to form the middle lamella, and three secondary walls in the form of S1, S2 and S3 layers. The three secondary walls are concentric and composed of cellulosic micro-fibrils, embedded in hemicelluloses and lignin. The middle secondary wall S2 is relevant to physical properties such as structural strength and elastic modulus because it contains most of the fibrous material. The microfibrils of the S2 layer trace a spiral around the fibre axis so that the microfibrils of the front and back walls of the S2 layer are crossed. The angle between the fibrillar direction and the fibre axis is termed the fibril angle or micellar angle or microfibril angle (MFA) of the fibre.

It is also known that a high MFA confers a low stiffness to the wood and so such wood is less suitable for structural timber then wood with a low MFA.

It will be appreciated that as a radius of curvature of a bend 40 at the intersection of each spike 14 and the crown 12 increases, a stress set up at the bend 40 as a result of the spikes 14 being driven apart is spread over a larger area of the crown 12 and vice versa. Thus increasing the radius of curvature of the bend 40 increases the resistance to bowing of the crown 12.

The inventor has found that such an increase in resistance to bowing can result in damage when the staple 10 is driven into wood in which the MFA is below a certain value. In other words, certain timbers suit certain radii of curvature of the bend 40.

Thus, the inventor(s) envisages that the staple 10 can be configured to suit different grades of timber. For example the radius of curvature can vary from about 2 mm to 10 mm in the exemplary embodiments described herein.

Tests carried out by the inventor(s) indicate that following table provides a guide to suitable radii of curvature for wire with a diameter of about 4 mm and yield strength of about 1570 MPa.

| TIMBER CHARACTERISTICS | | | | | | |
|---|---|---|---|---|---|---|
| Bending Strength (MPa) | Tension Strength (MPa) | Shear Strength (MPa) | Compression Strength (MPa) | Modulus of Elasticity (MPa) | Modulus of Rigidity (MPa) | BEND RADIUS (mm) |
| 16-17 | 8-10 | 2-5 | 12-25 | 6900-10000 | 450-700 | 5 mm |
| 25-30 | 12-16 | 2-7 | 20-30 | 9000-13000 | 600-900 | 5 mm |
| 40-45 | 20-25 | 3-10 | 30-35 | 12000-16000 | 800-11000 | 4 mm |

As is known, better quality timbers tend to be grown in cooler climates. The inventor(s) envisages that a radius of curvature of about 4 mm will be used with the same wire on timbers that originate from North American regions.

The inventor(s) envisages that other radii could be used as well. However, such radii will be limited to those that do not result in damage to the fibril structure of the timber. Thus, the results of the above tests are not to be regarded as limiting the scope of the appended claims in any way. Rather, they are intended to indicate to the skilled reader that the radius of curvature is to be selected based on the grade of timber to be used with the staple 10, rather than arbitrarily.

In particular, this allows the staple 10 to be configured to suit the wood species used in various geographical regions.

The inventor(s) has carried out tests on joints in which timber components are connected together in the manner described above with their respective grains generally at right angles to each other. In these tests, the joint was generally T-shaped with an end grain of a first component abutting a second component intermediate ends of the second component. It was found that tests to failure resulted in the second component splitting along the grain while the first component remained intact with the associated spike 14 remaining embedded in that first component.

The inventor(s) envisages that staples can be fabricated to suit timbers of particular species and regions to optimise strength and flexibility. Generally, timber is processed and marketed with 15% to 19% moisture content in service the moisture content can reduce to between about 6% and 12% depending on climatic conditions. Thus, the timber used in timber frame construction increases in strength and elasticity as the residual moisture levels decrease with natural ageing in situ. The natural lowering of the residual moisture levels also results in shrinkage of the timber which tends to cause the timber components to loosen as the timber ages. Varying the internal radius of the bends 40 of the staple 10 to suit the properties of the timber being joined can permit both initial and aged joint strength maximisation. Joints formed with conventional rigid timber connectors can loosen with timber shrinkage and expansion due to variations in moisture content levels. In contrast, the pre-stressed staple 10 is configured to accommodate such timber shrinkage and expansion due to the static pressure applied to the timber by the spikes 14.

The staple 10 can be used with various suitable elongate connectors to connect timber components to each other. An example of such a connector is a length of metal strip, such as a strip of galvanised steel or a strip of tinplate, as indicated with reference numeral 42 in the drawings. Such use of the staple 10 and the strip 42 is illustrated in FIGS. 9 to 13. In those drawings, timber components 46, 48 represent any two timber components that could be fastened together using the staples 10. For example, the timber components 46, 48 could represent any of the timber components described below with reference to the various assemblies. Thus, the timber components 46, 48 could represent the connection of a roof truss to a perimeter wall of a house.

The staple 10 can be driven through the strip 42 with the spikes 14 penetrating the strip 42. Alternatively, the strip 42 can be dimensioned so that the staple 10 can be driven into the timber with the crown 12 straddling the strip 42 such that the spikes 14 do not pierce the strip 42. In both cases, a portion of the strip 42 is sandwiched between the crown 12 and the timber. As described above, the crown 12 is partially embedded into the timber. Thus, a portion or region 44 of the strip 42 is driven into the timber together with the crown 12.

The inventor has found that the bowed crown 12 embedded into the timber with the region 44 sandwiched or interposed between the crown 12 and the timber provides resistance to relative movement of the strip 42 and the crown 12. Thus, the strip 42 can be positioned to overlie two or more timber components. A number of the staples 10 can be used to tie the components together by driving the staples 10 into the timber at appropriate locations.

Such a fastening method can find application in a number of timber framed constructions. For example, the method can be used in cross bracing timber framed walls, roof structures, trusses and other timber elements or components used in timber frame construction. The method also finds application for tying down roofing trusses to top rails, tying down ceiling joists or connecting various components at right angles to each other or at some other angle dictated by the structure in question.

As can be seen in FIGS. 9 to 13, the strip 42 is positioned to overlie the component 46 that, itself, is positioned on the component 48. Initially, one staple 10 is driven into the component 46 so that the strip 42 is secured to the component 46. Furthermore, the staple 10 is driven into the component 46 so that the strip 42 is straddled by the crown 12 and the strip 42 is not pierced by the spikes 14.

Detail of the manner in which the strip 42 is secured to the component 46 is shown in the cross-sectional FIGS. 12 and 13. As can be seen, the crown 12 is bowed towards the component 46, serving to generate an indentation at 50 in the timber which accommodates the region 44 of the strip 42 interposed between the crown 12 and the component 46. The cross-section drawings indicate how the shoulders 16 sit slightly proud of the remainder of the crown 12 is a result of the bowing of the crown 12.

The fact that the crown 12 generates the indentation 50 serves to crimp the region 44 into engagement with the timber and so inhibits movement of the region 44 relative to the timber.

It will be appreciated that the extent or size of the indentation will depend on such factors and timber hardness and power of the fastening gun used. A thickness of the strip is selected so that the indentation is formed. For example, a thickness can be selected to achieve, on average, an indentation of between about 0.5 mm and 1.5 mm for a wire radius of 2 mm.

An intermediate staple 10 is driven into the timber components 48 at an angle of about 45° relative to the strip 42 on each side of the component 46. This gives a guide for the width of the strip 42.

The intermediate staple 10 engages the strip 42 and the component 48 in the same manner as the staple 10 engages the strip 42 and the component 46, apart from the relative orientation of the strip 42 and the intermediate staple 10. This is to be expected since the staples 10 will usually be fired from a staple gun. It is to be understood, however, that characteristics of the timber can also determine the extent or size of the indentation 50.

An end or anchoring staple 10 is driven into the timber component 46 with the spikes 14 piercing the strip 42 on each side of the component 46, outside of the intermediate staples 10. The anchoring staples 10 are driven into the timber component 46 in close proximity to the intermediate staples 10. This serves to enhance resistance to tearing of the strip 42 when the joint is subjected to stress events. As can be seen, the anchoring staples 10 are angled with respect to the intermediate staples 10.

The fact that the strip 42 is embedded slightly into the timber can be used to generate a level of tension within the strip 42 during assembly. Thus, the strip 42 can be pre-tensioned, if necessary.

The method of assembly described above can be used on any of the assemblies described below.

The inventor(s) has found that the manner of connection described with reference to FIGS. 9 to 13 provides a joint in which some degree of relative movement of the components 46, 48 is permitted while the joint remains structurally intact. The inventor(s) has found that such relative movement is not possible with conventional plate connectors, such as gang nails without the spikes or nails being partially retracted from the timber resulting in a significant loss of structural integrity of the joint. When using the strip 42 and the staples 10, in the manner described above, some degree of relative movement can be accommodated when the associated structure is subjected to stresses resulting from, for example, inclement weather conditions, without damage to the joint itself, either by partial extraction of the staples 10 or damage to the strip 42.

In the above application, the inventor(s) envisages that the strip 42 can be wrapped around the ends of the component 48 and further staples 10 used to secure the strip 42 to an underneath side of the component 48. It will also be readily appreciated that a further strip 42 and further staples 10 can be used to reinforce the joint, when necessary.

FIGS. 14 and 15 illustrate an application of the staple 10. In this example, the staple 10 is used to fasten a fitting, such as an electrical switch-fitting 52 to a structural component. The switch fitting 52 can be of any suitable material, such as a sheet of metal, for example galvanised steel. The fitting 52 is rectangular and includes an anchor portion 54 and a carrier portion 56.

The anchor portion 54 is secured to a structural component in the form of a vertical post 58, for example, of a wall assembly with one or more of the staples 10. As can be seen in the drawings, the anchor portion 54 is secured to the post 58 so that the carrier portion 56 extends generally at right angles from the post 58 and generally coplanar with a surface 60 of the post 58 to which the ankle portion 54 is secured. Thus, once cladding is secured to the post 58, a light switch or other electrical component can be secured to the carrier portion 56.

The carrier portion 56 defines an aperture 60 and a pair of holes 62 to accommodate the electrical component.

As can be seen in FIG. 13, the bowing of the crown 12 and the force exerted by the crown 12 due to the staple gun results in the anchor portion 54 crimping at 64 and generating an indentation 66 in the post 58. As with the strip 42, as described above, this serves to secure the anchor portion 54 relative to the post 58.

Conventionally, such fittings are screwed into the studs of the wall assembly. It will be appreciated that this is significantly more time-consuming than simply shooting the staple 10 into the post 58.

FIG. 16 illustrates another application of the staple 10. In this example, the staple 10 is used to fasten a fitting, such as a conduit holder 68 to the post 58.

The holder 68 includes a base 70. The base 70 can be of any suitable material such as such as a sheet of metal, for example galvanised steel. The base 70 includes an anchor portion 72 and a carrier portion 74.

The anchor portion 72 is fastened to the post 58 with one or more staples 10 in the same manner as the anchor portion 54 is fastened to the post 58.

A number of conduit clips 76 are fixed to the carrier portion 74 to support conduits 78, as shown in FIG. 14.

FIGS. 17 and 18 illustrate a manner of connecting two components 80, 82 together using the staples 10 and a corrugated strip of metal 84.

In this application, the staples 10 are driven into the components 80, 82 so that the respective crowns 12 straddle the strip 84 and are located in associated troughs 86.

FIG. 18 shows how one of the troughs 86 is partially embedded in the timber. This creates an indentation 88 in which the trough 86 carrying the crown 12 is seated. As a result, extraction of the strip 84 from underneath the crown 12 is inhibited.

It will be appreciated that the corrugated strip 84 can readily replace the strip 42, if desired or required.

FIGS. 19 and 20 illustrate a further manner of connecting two components 90, 92 together using the staples 10 and a knuckle nail plate 94.

Knuckle nail plates are usually galvanised steel connectors with integral "knuckle" nails 96. These are used for a large number of structural and non-structural timber jointing and timber protection applications. The plate 94 can be seated flat on the timber to be joined. The nails 96 are either hammered or pressed into the timber to fasten the nail plate 94 to the timber components 90, 92.

In this application, the staples 10 are driven into the components 90, 92 so that the crown 12 straddles the plate 94 between consecutive rows of nails 96. Once the plate 94 is located as shown in FIGS. 19 and 20, the nails 96 can be hammered further into the timber components 90, 92.

Thus, the components 90, 92 are secured together both by the nails 96 and the staples 10. The staples 10 can thus be used to secure or properly locate the plate 94 prior to hammering the nails 96 into the timber.

FIGS. 21 and 22 illustrate how the staples 10 are used together with a gang nail connector 98 to fasten two components 100, 102 together. In this application, the staples 10 can be driven into the timber components 100, 102 so that the crowns 12 straddle the connector 98.

The staples 10 can be driven into the timber components 100, 102 as a manner of refurbishing the joint defined by the components. Alternatively, the staples 10 can be driven into the timber components 100, 102 straight after the connector 98 has been pressed into the timber. This can be a way of strengthening the joint where the associated timber assembly is to be used in a high stress area or region, for example, a region that is subject to inclement weather, earthquake or other natural events that can damage buildings.

The staples 10 and lengths of the strip 42 can be used to fabricate a number of different forms of structural timber assemblies.

In FIGS. 23 to 25, there is shown a wall assembly 104. The wall assembly 104 includes a series of vertical timber studs 108 that extend between an upper frame member 106 and a bottom rail 110. The upper frame member 106 is attached to an upper or top rail 112.

Two strips 42 are used. Each strip 42 extends diagonally from one upper corner 114 to an opposed lower corner 116. Thus, the strips 42 overlap in a central area of the wall assembly 104, as shown in further detail in FIG. 24. The staples 10 are driven into the studs 108 along each of the strips 42 with the crowns 12 in a vertical orientation. In FIG. 23, one staple 10 per strip 42 is used for each stud 108. However, it is to be appreciated that, depending on the application, two of the staples 10 can be used per strip 42 for each stud 108.

As can be seen in FIG. 25, two staples 10 are used in proximity to each other at each of the corners 114, 116. At the corners 114, an inner staple 10 is driven into either or both of the upper frame member 106 and top rail 112. An external or outer staple 10 is driven into either or both of the frame member 106 and top rail 112 to form an anchor staple in the manner described with reference to FIGS. 9 to 13.

At the corners 116, an inner staple 10 is driven into either or both of one of the studs 108 and the bottom rail 110. An external or outer staple 10 is driven into the bottom rail 110 again to form an anchor staple 10 in the method described with reference to FIGS. 9 to 13. The anchor staples 10 are generally orthogonal with respect to the inner staples 10 and driven into the respective components so that the spikes 14 pierce the strip.

The manner in which the staples 10 engage the, strips 42 is described with reference to FIGS. 9 to 13, above. Thus, the crowns 12 can keep the strips 42 in tension, inhibiting slippage of the strips 42 relative to the crowns 12.

It is envisaged that the strips 42 can extend right over the top rail 112 and be fastened to the other side of the wall assembly in the same manner. Furthermore, other strips 42 can be fastened to the components of the wall assembly, when necessary, for reinforcing.

Also, this method can be used to tie the top plate or rail 112 of a perimeter frame to the bottom plate of a wall in a manner which is significantly quicker and more efficient than conventional methods. Instead of the diagonal arrangement shown in the drawings, the strips 42 can be arranged vertically to extend from one side of a bottom rail, over the top plate and down to the other side of the bottom rail and secured with the staples 10.

In this application, it is not necessary for the fabricator to make any holes in the timber, which may be required for screws or similar fasteners. As a result, a significant saving in time can occur when compared with fabricating wall frames using conventional methods. Furthermore, the "cross-bracing" provided by the strips 42 can be used for wind load bracing instead of plywood sheeting on corner panels. Such cross-bracing is significantly cheaper and less time-consuming to fix then conventional cross-bracing products.

Where this application is applied to buildings such as dwellings, the inventor(s) envisages that the strip 42 can have a width of between about 45 mm and 50 mm.

In FIGS. 26 to 29, reference numeral 120 generally indicates a roof truss assembly that is fabricated using the staples 10 and a number of the strips 42.

More particularly, and as shown in detail in FIG. 27, a hip joint 122 of the roof truss assembly 120 is assembled using the staples 10 and a number of the strips 42. A pair of roof rafters 124 and a vertical member 129 are connected together using a number of the staples 10 to define a roof peak 126. The manner in which the rafters 124 are connected together is described with reference to FIGS. 1 to 13 that provide a broad description of the manner in which timber components are fastened together using one or more of the staples 10. Also, the method described with reference to FIGS. 9 to 13 is used together with the strip 42 to fasten the various components together.

As can be seen in the drawings, a number of the staples 10 are driven directly into the timber apart from the strip 42. The staples 10 can be used off-site or on-site to provide an initial assembly of the components of the roof truss assembly. The benefits of this have been described above.

Subsequently, the strips 42 can be secured to the various components to finish the roof truss assembly.

In the hip joint 122, one strip 42 spans each side of the hip joint 122 and is oriented generally horizontally. Three staples 10 are driven into each respective roof rafter 124 so that the crowns 12 of two of the staples 10 straddle the strip 42 and a crown 12 of external or outer staples 10 are between edges of the strip 42 with their spikes 14 piercing the strip 42 to provide anchor staples 10, the purpose of which is described with reference to FIGS. 9 to 13. The crowns 12 of the straddling staples 10 can be generally orthogonal with respect to the strip 42 while the crowns 12 of the external or outer staples 10 can be generally parallel to the strip 42.

The inventor(s) envisages that the corrugated strip 84 can replace the strip 42 in this application to assist in joint twisting resistance and prevention of sideways slipping of the joint.

FIG. 27 should also be understood as indicating a manner in which such a hip joint can be refurbished or assembled, in situ. It will readily be appreciated that the arrangement of the staples 10 and the strip 42, as shown, can be achieved without the need for any off-site operation.

The inventor(s) believes that using the staples 10 down a vertical joint, as shown, and the strip 42 fixed across the joint beneath the vertical joint, provides a hip joint that is capable of absorbing constantly changing wind load impacts and what would be regarded as high stress events. More particularly, the staples 10 along the vertical joint that is without the strip 42, can serve to absorb the wind load impacts while the strip 42 as fastened in position with the staples 10 can manage the high stress events.

FIG. 28 shows detail of a web 128 connected to one of the roof rafters 124. A strip 42 is positioned to extend from one side of the web 128, over the roof rafter 124 and down onto the other side of the web 128. This is also shown in FIG. 29.

A staple 10 is used to fasten a central portion of the strip 42 to an upper edge 130 of the roof rafter 124. The staple 10 is driven into the upper edge 130 so that the crown 12 straddles the strip 42. A further straddling staple 10 is driven into each respective side of the rafter 124 so that the crown 12 of the staple 10 straddles the strip 42. A further straddling staple 10 is driven into the web 128 on each side of the web 128 so that the crown 12 of the staple straddles the strip 42. An anchoring staple 10 is driven into the web 128 between each free end of the strip 42 and said further staple 10.

FIG. 30 shows detail of one of the roof rafters 124 connected to a ceiling rafter 132.

The strip 42 is positioned to extend from one side of the ceiling rafter 132, over the roof rafter 124, to the other side of the ceiling rafter 132.

A staple 10 is driven into the upper edge 130 of the ceiling rafter 132 so that the crown 12 straddles the strip 42 and is generally aligned with the rafter 132. A staple 10 is driven into each side of the roof rafter 124 with the crown 12 straddling the strip 42. A staple 10 is also driven into each side of the ceiling rafter 132 with the crown 12 straddling the strip 42. An anchor staple 10 is driven into each side of the ceiling rafter 132 with the spikes 14 piercing the strip 42 between the straddling staple 10 and an end of the strip 42.

The strip 42 can also be wrapped around a bottom side of the ceiling rafter 132 and secured to that side with a staple 10 straddling the strip 42.

In FIG. 31, reference numeral 140 generally indicates an exemplary embodiment of a parallel chord truss assembly fabricated or refurbished using the staples 10 and the strips 42. As with the previous embodiments, the strip 42 can be replaced with the corrugated strip 84. The manner in which the strips 42 are fastened to the various components of the truss assembly 140 is described above with reference to FIGS. 9 to 13.

The truss assembly 140 has an upper chord 142, a lower chord 144, a series of vertical chords 146 interconnecting the upper and lower chords 142, 144 and a series of diagonal chords 148 extending between internal corners defined by the vertical chords 146 and the upper and lower chords 142, 144.

In this embodiment, the chords 142 to 148 are connected together with the staples 10 driven through the chords in appropriate positions indicated in FIG. 31.

Detail of a joint 152 defined by a vertical chord 146, either of the upper and lower chords 142, 144 and two diagonal chords 148 is shown in FIG. 30.

A strip 42 is positioned over each side of the vertical chord 146. A staple 10 is driven into a top or bottom edge of the chord 142, 144 to straddle the strip 42 in the manner described above. A pair of staples 10 is driven into each side of the chord 142, 144 to straddle the strip 42. A further staple 10 is driven into each side of the vertical chord 146. An anchoring staple 10 is driven into each side of the vertical chord 146 with the spikes 14 piercing the strip 42.

Strips 42 are positioned about each diagonal chord 148 to extend over the chord 142, 144. Each strip 42 is secured to the chord 142, 144 with a staple 10 driven into an edge of the chord 142, 144 so that the crown 12 straddles the strip 42. Each strip 42 is secured to respective sides of the chord 142, 144 and the diagonal chords 148. As before, an anchoring staple 10 is driven into respective sides of the diagonal chords 148 with the spikes 14 piercing the strip 42.

The vertical chords 146 are connected to the chords 142, 144 opposite the joints 152 to form T-joints 154.

A strip 42 is positioned over the chord 142, 144 to extend over respective sides of the chord 142 and the vertical chord 146. Each strip 42 is secured to the chord 142, 144 with a staple driven into an edge of the chord 142, 144 so that the crown 12 straddles the strip 42. Each strip 42 is secured to respective sides of the chord 142, 144 and the vertical chord 146. As before, an anchoring staple 10 is driven into respective sides of the vertical chord 146. The anchoring staples 10 are positioned between respective ends of the strip 42 and the staple 10 that is driven into respective sides of the vertical chord to straddle the strip 42.

Parallel chord trusses can be difficult to fabricate on site because it is usually necessary to roll conventional plate connectors into engagement with the chords. Alternatively, the chords are presently bolted together.

Use of the staples 10 and the strips 42 as described above allows the parallel chord truss to be fabricated on site to suit a particular application. It will readily be appreciated that use of the strips 42 and staples 10 can result in a fabrication process that is quicker and more convenient than using conventional plate connectors and/or nut and bolt assemblies.

Furthermore, the method described above with reference to the parallel chord truss allows long span trusses to be made with larger than usual timber components, since any number of strips 42 can be used for the joints.

In the above examples, it can be seen that the anchoring staple is in close proximity to the preceding straddling staple. This inhibits tearing of the strip during significant stress events.

In one example, the staples 10 can be used to retain the timber members or components in the correct position before gang nail connectors or local plate connectors or the like are secured in position. Thus, the staples 10 can be used to inhibit any movement of the components defining each of the joints while the connectors are secured to form the joints. As is known, even slight movement of the joint components can provide an almost immediate joint failure when using such connectors.

Thus, the staples 10 can be used to retain the components of the timber joints in a pre-stressed condition. The connectors can then be secured together using further staples 10, in the manner described above. As a result, a joint is provided in which the fasteners are secured to the respective components of the joint in a manner in which withdrawal is significantly inhibited. It will be appreciated by a person of skill in the field that such an arrangement provides a means whereby various timber assemblies, such as those described above, can be constructed on site. The inventor(s) submits that such on-site construction is more convenient than having the truss fabricated in a factory that is remote from the structure in question. Furthermore, the inventor(s) submits that on-site assembly or construction is significantly easier than on-site assembly or construction using presently known methods.

FIG. 33 shows an example of a joint 156 that is refurbished using a number of the staples 10. In this example, the joint 156 is formed using a gang nail connector 158. However, it will be appreciated that the joint 156 can be formed using a knuckle plate connector, as described above. Furthermore, the drawing could also indicate a joint 156 that is fabricated using both a connector and a number of the staples 10.

In the case of refurbishment, the staples 10 can simply be driven into engagement with respective components 160, 162 such that the spikes 14 pierce the connector 158 and are driven into the timber to secure the connector 158 in position. This can occur when it is found that the connector 158 has deteriorated or has been damaged. The inventor(s) has found that the characteristics of the staples 10, as described above, can actually serve to draw the components into abutment with each other so to correct separation of the components.

In this specification, use of the word "timber" is to be understood as referring to a sawn wood product. For example, in the United Kingdom and other Commonwealth countries such as Australia and New Zealand, "timber" is a term used for sawn wood products. The equivalent term in the United States and Canada is "lumber". Thus, for the sake of convenience, "timber" has an equivalent meaning to "lumber" in that use refers to sawn wood products.

It is to be appreciated that the timber components can be replaced with components of other structural materials such as composites, plastics material and others that are capable of having sharpened fasteners or connectors driven into or through them for connecting to each other or for having other components connected to them.

Throughout the specification, including the claims, where the context permits, the term "comprising" and variants thereof such as "comprise" or "comprises" are to be interpreted as including the stated integer or integers without necessarily excluding any other integers.

It is to be understood that the terminology employed above is for the purpose of description and should not be, regarded as limiting. The described embodiments are intended to be illustrative of the invention, without limiting the scope thereof. The invention is capable of being practised with various modifications and additions as will readily occur to those skilled in the art.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of words that indicate orientation or direction of travel is not to be considered limiting. Thus, words such as "front", "back", "rear", "side", "up", "down", "upper", "lower", "top", "bottom", "forwards", "backwards", "towards", "distal", "proximal", "in", "out" and synonyms, antonyms and derivatives thereof have been selected for convenience only, unless the context indicates otherwise. The inventor envisages that various exemplary embodiments of the claimed subject matter can be supplied in any particular orientation and the claimed subject matter is intended to include such orientations.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

a. there is no requirement for the inclusion of any particular described or illustrated characteristic, function, activity, or element, any particular sequence of activities, or any particular interrelationship of elements;

b. no characteristic, function, activity, or element is "essential";

c. any elements can be integrated, segregated, and/or duplicated;

d. any activity can be repeated, any activity can be performed by multiple entities, and/or any activity can be performed in multiple jurisdictions; and e. any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

The invention claimed is:

1. A staple configured for loading into a fastening gun in a pre-use state and configured for fastening structural components of timber together in a post-use state and wherein the timber has timber characteristics, said staple-comprising:

said pre-use state wherein said staple comprises:
a length of wire of high tensile steel and having a diameter of between 2 mm and 7.5 mm, the length of wire being shaped to form:
an unbowed crown; and
two spikes, each spike depending from a respective end of the crown and including:
a rounded shoulder at each end of the crown, the shoulder including a depending portion that depends vertically downward from the crown and the shoulder having an internal radius of curvature greater than 2 mm, said internal radius of curvature being predetermined based upon the timber characteristics to decrease resistance of said staple to bowing of said crown when said components of timber are being fastened together;
a sharpened tip portion; and
an elbow interposed between each tip portion and the shoulder, the elbow having a proximal limb that depends from the depending portion and a distal limb that depends from the proximal limb such that the tip portions depend from the distal limbs; wherein a first included angle between a longitudinal axis of the crown and a longitudinal axis of the depending portion is between 91° and 96°;

a second included angle between a longitudinal axis of the proximal limb and the longitudinal axis of the crown is between 66° and 85° ; and a third included angle between a longitudinal axis of each distal limb and the longitudinal axis of the crown is between 95° and 130° ; and said post-use state wherein said staple comprises:

said crown being bowed downward against the structural components when said spikes are driven into the timber by the fastening gun, and displaced away from one another, within respective structural components of timber.

2. The staple as claimed in claim 1, in which the metal of the wire has a yield strength of not less than 1300 M Pa.

3. The staple as claimed in claim 2, in which the metal of the wire has a yield strength of between 1300 MPa and 1800 MPa.

4. The staple as claimed in claim 1, in which an included angle between each tip portion and the crown is approximately 90°.

5. The staple as claimed in claim 1, in which the first included angle is less than 95°.

6. A method of fastening structural components of timber together, the timber having timber characteristics, the method including the steps of:

forming a staple comprising:
a length of wire of high tensile steel and having a diameter of between 2 mm and 7.5 mm, the length of wire being shaped to form:
an unbowed crown; and
two spikes, each spike depending from a respective end of the crown, and including:
a shoulder at each end of the crown, the shoulder including a depending portion that depends from the crown and the shoulder having an internal radius of curvature greater than 2 mm;
a sharpened tip portion; and
an elbow interposed between each tip portion and the shoulder, the elbow having a proximal limb that depends from the depending portion and a distal limb that depends from the proximal limb such that the tip portions depend from the distal limbs; wherein
a first included angle between a longitudinal axis of the crown and a longitudinal axis of the depending portion is between 91° and 96°;
a second included angle between a longitudinal axis of the proximal limb and the longitudinal axis of the crown is between 66° and 85° ; and
a third included angle between a longitudinal axis of each distal limb and the longitudinal axis of the crown is between 95° and 130°;

selecting said staple whose internal radius of curvature is predetermined based upon the timber characteristics to decrease resistance of said staple to bowing of said crown when said components of timber are being fastened together;

positioning a length of flexible connecting material on at least two of the structural components of timber;

driving said staple into the structural components of timber such that each spike is driven into a respective structural component; and urging said spikes away from each other while bowing said crown downward against said flexible connecting material and the structural components.

7. The method as claimed in claim 6, wherein the step of bowing said crown comprises a portion of the connecting material that is interposed between the crown and the structural components is at least partially embedded in the timber.

8. The method as claimed in claim 7, in which the length of connecting material has a width that is less than a length of the crown and the staple is driven into the structural components such that the spikes are driven directly into the timber without penetrating the length of connecting material and the crown straddles the length of connecting material.

9. The method as claimed in claim 6, in which the length of flexible connecting material is a metal strip.

10. The method as claimed in claim 9, in which the metal strip is corrugated and the method includes the step of driving the staple into the structural component such that the crown nests in a trough defined by the metal strip.

11. A method of fastening structural components of timber together, the timber having timber characteristics, the method including the steps of:

forming a staple comprising:
a length of wire of high tensile steel and having a diameter of between 2 mm and 7.5 mm, the length of wire being shaped to form:
an unbowed crown; and
two spikes, each spike depending from a respective end of the crown, and including:
a shoulder at each end of the crown, the shoulder including a depending portion that depends from the crown and the shoulder having an internal radius of curvature greater than 2 mm;
a sharpened tip portion; and
an elbow interposed between each tip portion and the shoulder, the elbow having a proximal limb that depends from the depending portion and a distal limb that depends from the proximal limb such that the tip portions depend from the distal limbs; wherein
a first included angle between a longitudinal axis of the crown and a longitudinal axis of the depending portion is between 91° and 96°;
a second included angle between a longitudinal axis of the proximal limb and the longitudinal axis of the crown is between 66° and 85° ; and
a third included angle between a longitudinal axis of each distal limb and the longitudinal axis of the crown is between 95° and 130°;

selecting said staple whose internal radius of curvature is predetermined based upon the timber characteristics to decrease resistance of said staple to bowing of said crown when said components of timber are being fastened together;

positioning a connector on at least two of the components;

driving said staple into the structural components of timber such that each spike is driven into a respective structural component; and urging said spikes away from each other while bowing said crown downward against said connector.

12. The method as claimed in claim 11, in which the connector has a width that is less than a length of the crown and the staple is driven into the structural components such that the spikes are driven directly into the timber without penetrating the connector and the crown straddles the connector.

13. The method as claimed in claim 11, in which the connector is in the form of a metal fastener used for fastening timber components together.

14. The method as claimed in claim 11, in which the connector is a strip of corrugated metal, and the method includes the step of driving the staple into the structural component such that the crown nests in a trough defined by the connector.

15. A method of fastening structural components of timber together, the timber having timber characteristics, the method including the step of:
  forming a staple comprising:
    a length of wire of high tensile steel and having a diameter of between 2 mm and 7.5 mm, the length of wire being shaped to form:
    an unbowed crown; and
    two spikes, each spike depending from a respective end of the crown, and including:
    a shoulder at each end of the crown, the shoulder including a depending portion that depends from the crown and the shoulder having an internal radius of curvature greater than 2 mm;
    a sharpened tip portion; and
    an elbow interposed between each tip portion and the shoulder, the elbow having a proximal limb that depends from the depending portion and a distal limb that depends from the proximal limb such that the tip portions depend from the distal limbs; wherein
    a first included angle between a longitudinal axis of the crown and a longitudinal axis of the depending portion is between 91° and 96°;
    a second included angle between a longitudinal axis of the proximal limb and the longitudinal axis of the crown is between 66° and 85° ; and
    a third included angle between a longitudinal axis of each distal limb and the longitudinal axis of the crown is between 95° and 130°;
  selecting said staple whose internal radius of curvature is predetermined based upon the timber characteristics to decrease resistance of said staple to bowing of said crown when said components of timber are being fastened together;
  driving said staple into the structural components of timber such that each spike is driven into a respective structural component; and
  urging said spikes away from each other while bowing said crown downward against said structural components of timber to pre-tension said staple, said crown being at least partially embedded in the timber.

\* \* \* \* \*